Feb. 16, 1965 M. K. HAYNES 3,170,145

CRYOGENIC MEMORY SYSTEM WITH SIMULTANEOUS INFORMATION TRANSFER

Filed May 18, 1960 15 Sheets-Sheet 1

INVENTOR.
MUNRO K. HAYNES
BY
Thomas & Crickenberger

Feb. 16, 1965 M. K. HAYNES 3,170,145
CRYOGENIC MEMORY SYSTEM WITH SIMULTANEOUS INFORMATION TRANSFER
Filed May 18, 1960 15 Sheets-Sheet 2

3,170,145

CRYOGENIC MEMORY SYSTEM WITH SIMULTANEOUS INFORMATION TRANSFER

Munro K. Haynes, Poughkeepsie, N.Y., assignor to International Business Machines Corporation, New York, N.Y., a corporation of New York Filed May 18, 1960, Ser. No. 30,019
2 Claims. (Cl. 340—173.1)

This invention relates to memory systems and more particularly to such systems wherein information may be supplied to and extracted from the memory simultaneously and wherein information may be transferred internally between registers.

In earlier known types of memory systems it has been customary to read and write in successive time intervals. Information stored in one location may be transferred to another location, but this usually involves one memory cycle to get the information from one location and another memory cycle to return the information to the new location. Furthermore, this involves one transfer of information from the memory to an external storage device where the information is temporarily stored, and a second transfer from the external storage device back to the new location in memory. The time required for such transfers is relatively great, and the external storage equipment may involve in some instances an increase in the cost of manufacture and maintenance of the computing device.

In computers currently in use it is customary when using a plurality of load devices which send and receive information from the memory to determine a scheme of priority which indicates the relative order in which the load devices are serviced by the memory. Such an arrangement is employed because the memory may supply or receive but one word at a given instant. Thus the load devices may be ready to send or receive information, but they must await their turn to be serviced by the memory. This involves a substantial loss of time and to this extent a decrease in the operating efficiency of the computer.

In various arrangements according to this invention information is stored in a memory device which includes a plurality of registers arranged to form the rows in an array configuration. Each register has a plurality of storage positions or stages formed from superconductive loops. Corresponding storage positions in the registers make up the columns in the array configuration. Cryotrons are used to control the information represented in the system as currents, and the presence or absence of currents in the storage loops provides indications of stored binary information. The information in a selected register of memory may be transferred internally from one register to another register without requiring a data transfer to a device external to the memory. Information may be read from one location in memory to an external device, and simultaneously information from an external device may be written in one or more registers of the memory. Information from an external device may be written in a given location of memory, and simultaneously two or more storage locations in memory may be read to two or more external devices. Furthermore, information in one location of memory may be transferred to another location in the memory while this information is being read out simultaneously to an external device.

The flexible memory device of this invention may take many forms in practice. It is adaptable to numerous types of bistable storage devices, and it is especially suitable for use with cryotrons and other cryogenic devices. The invention is illustrated herein with the use of cryotrons, but it is to be understood that the invention is not limited to cryotrons or cryogenic devices since other types of bistable storage devices may be equally well employed.

The foregoing and other features of this invention may be more fully appreciated when considered in the light of the following specification and the drawings in which.

Figure 10:
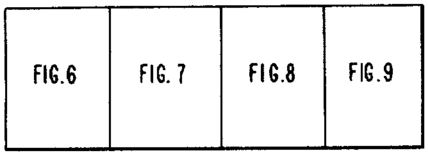
Figure 14:
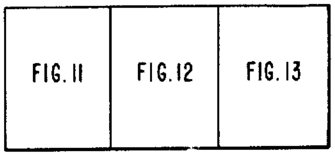
Figure 18:
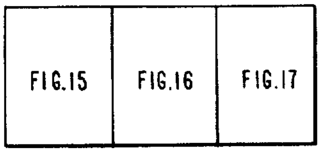
Figure 21:
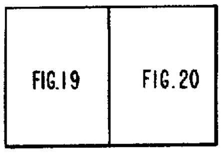
Figure 22:
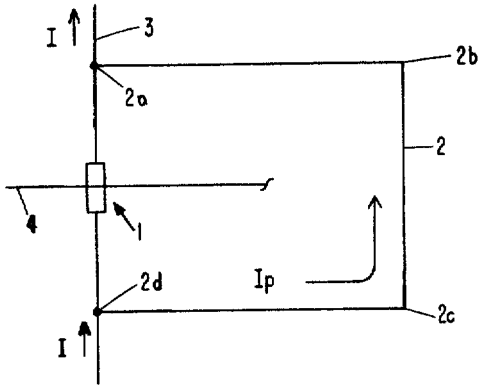
Figure 6:
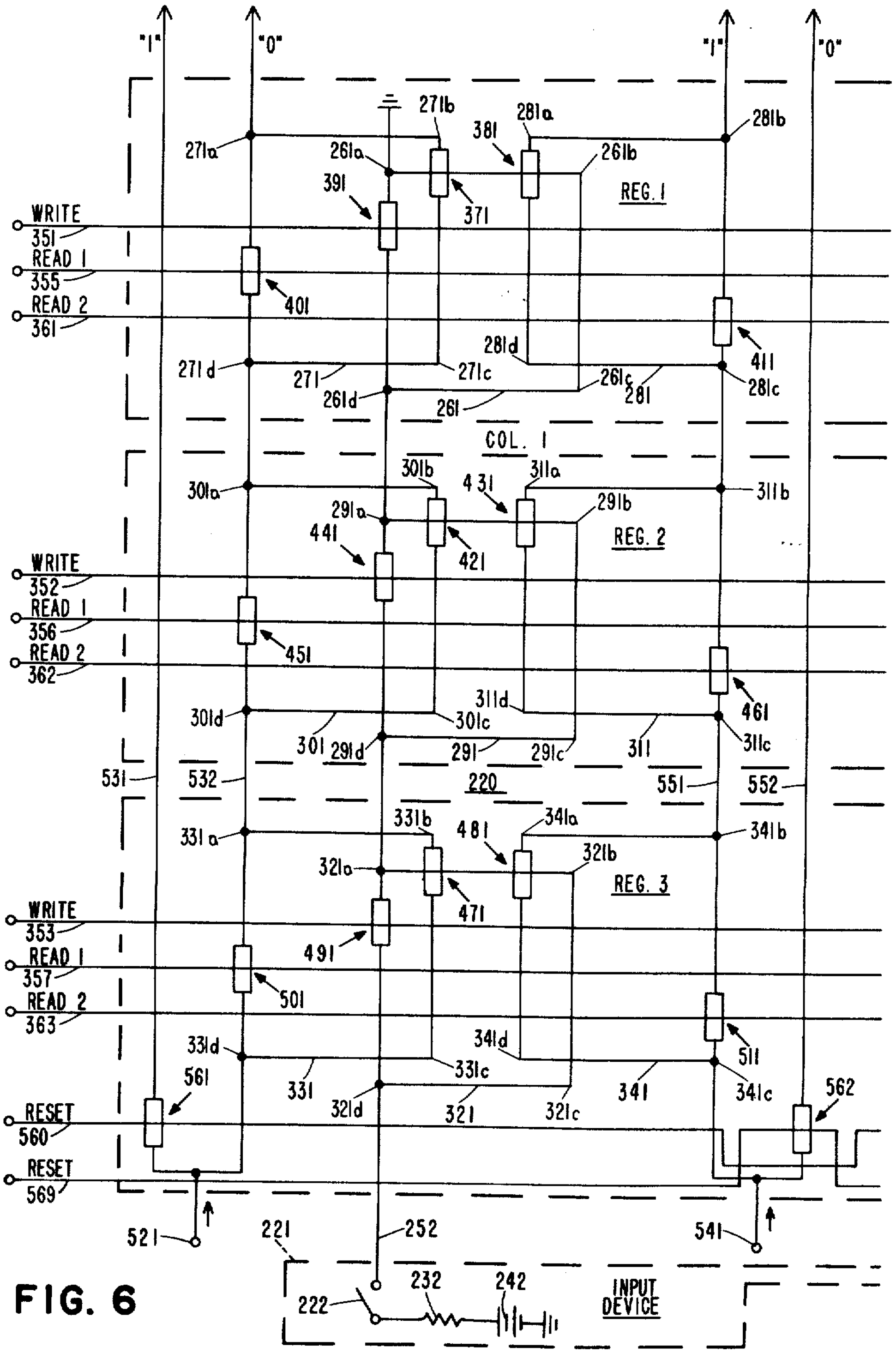
FIGS. 6 through 9 illustrate another memory arrangement according to this invention.
Figure 7:
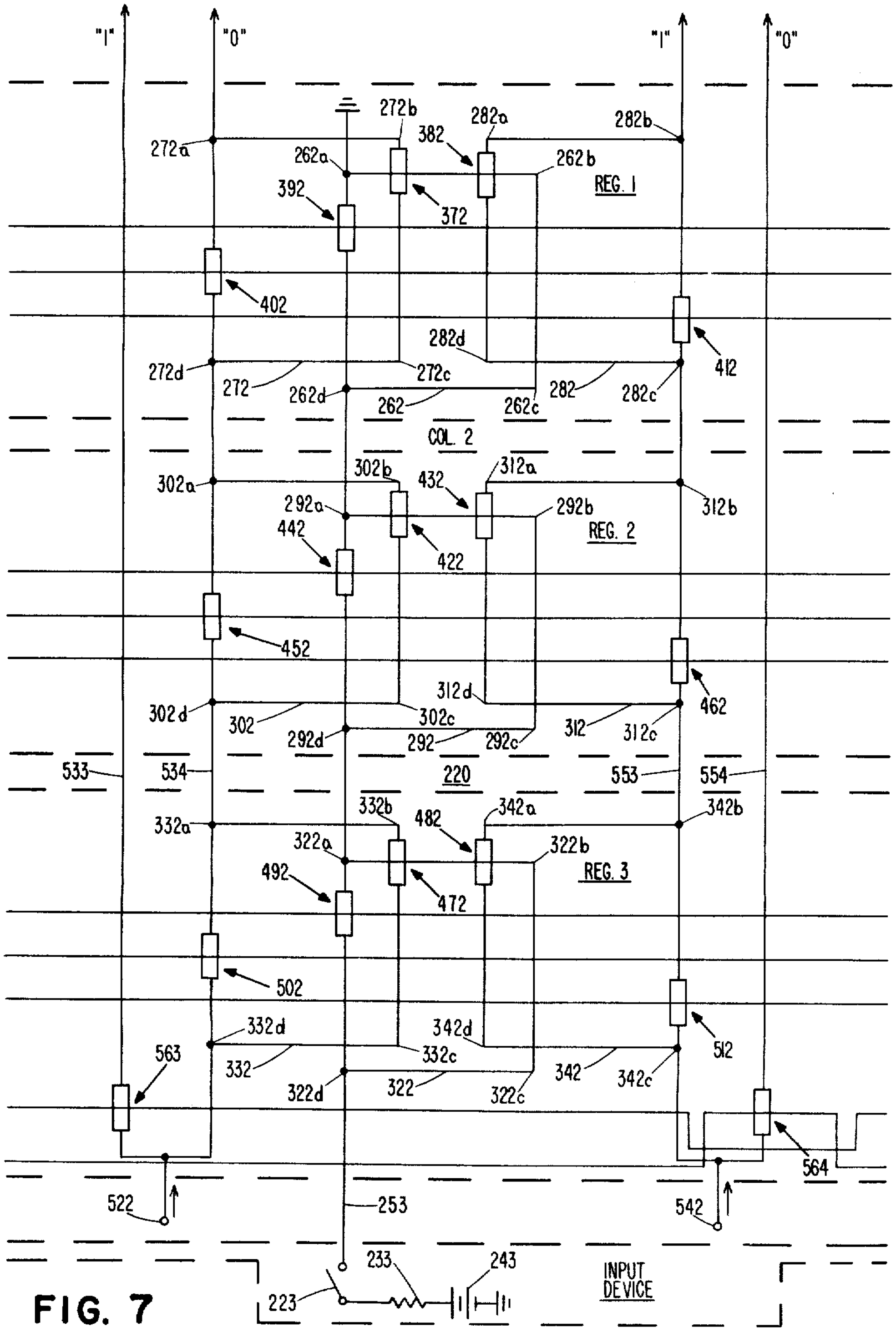
Figure 8:
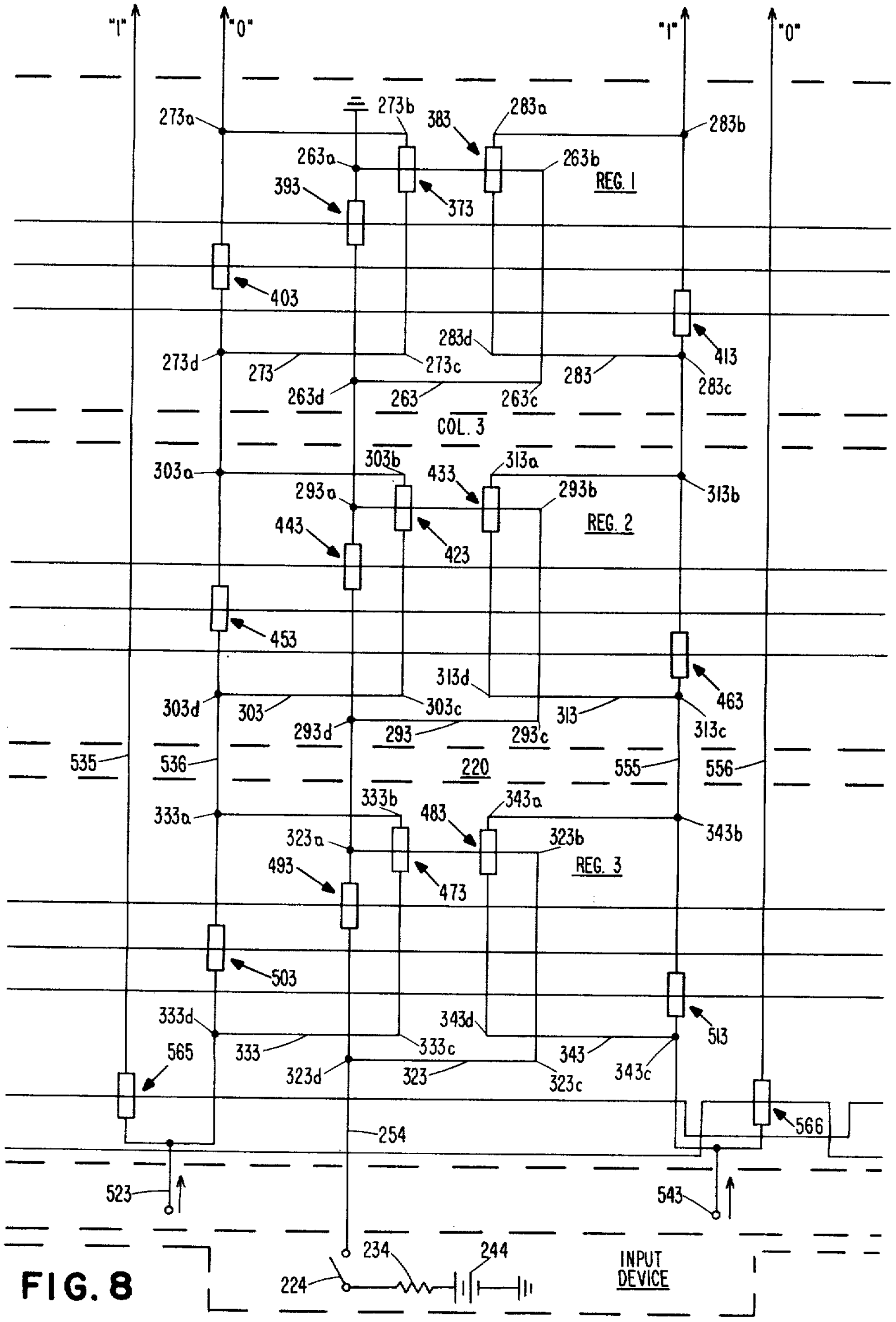
Figure 9:
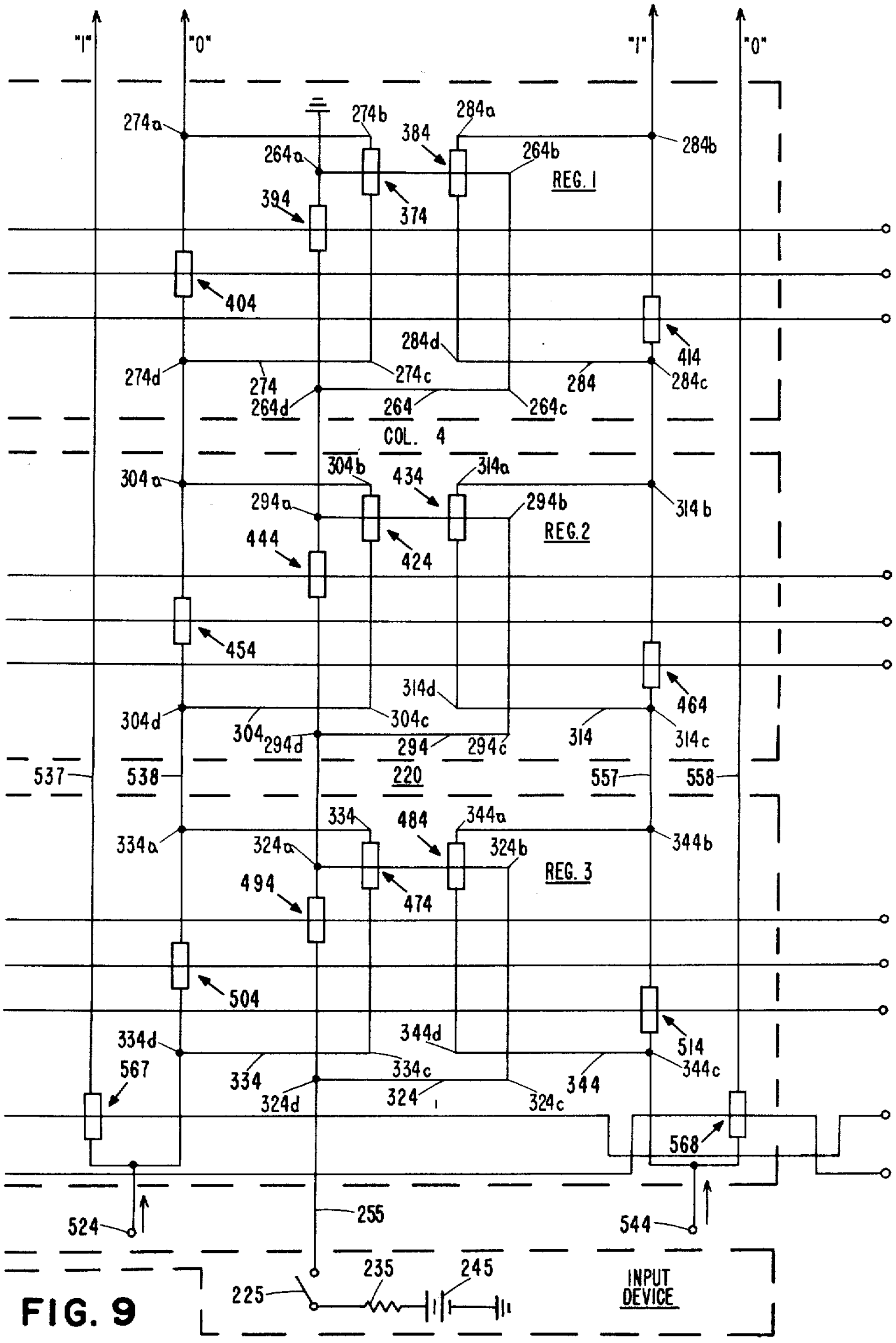
Figure 11:
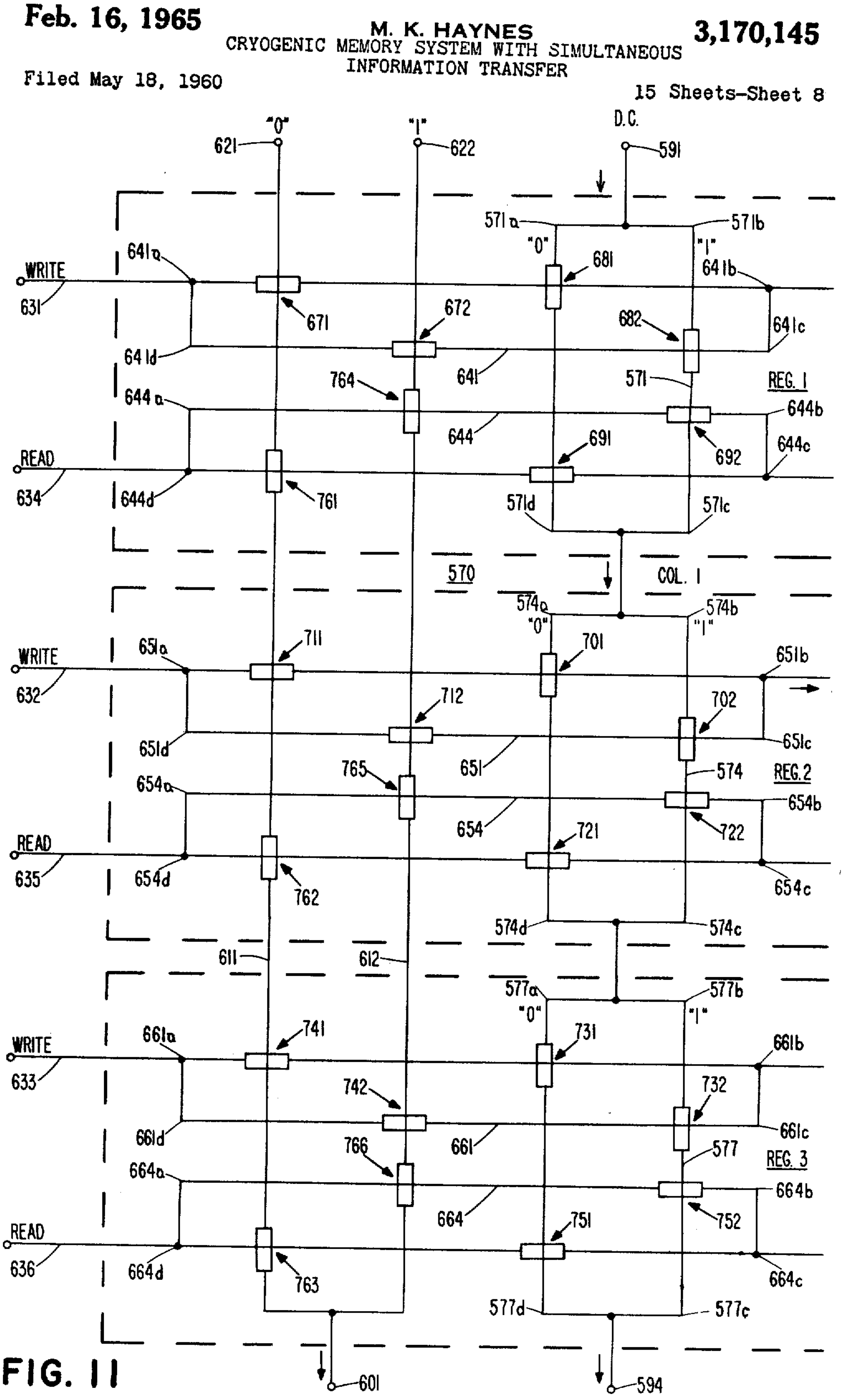
Figure 12:
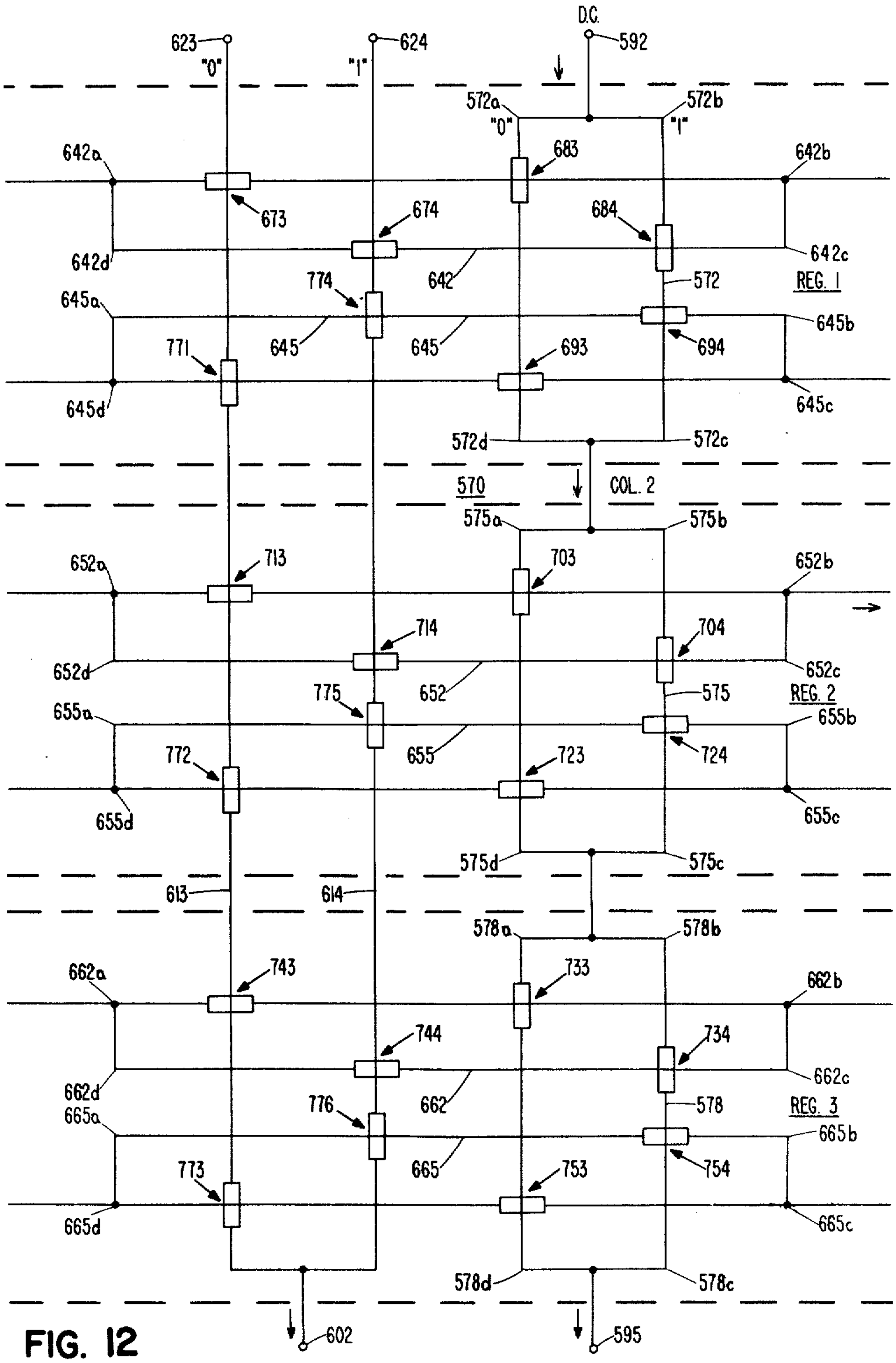
Figure 13:
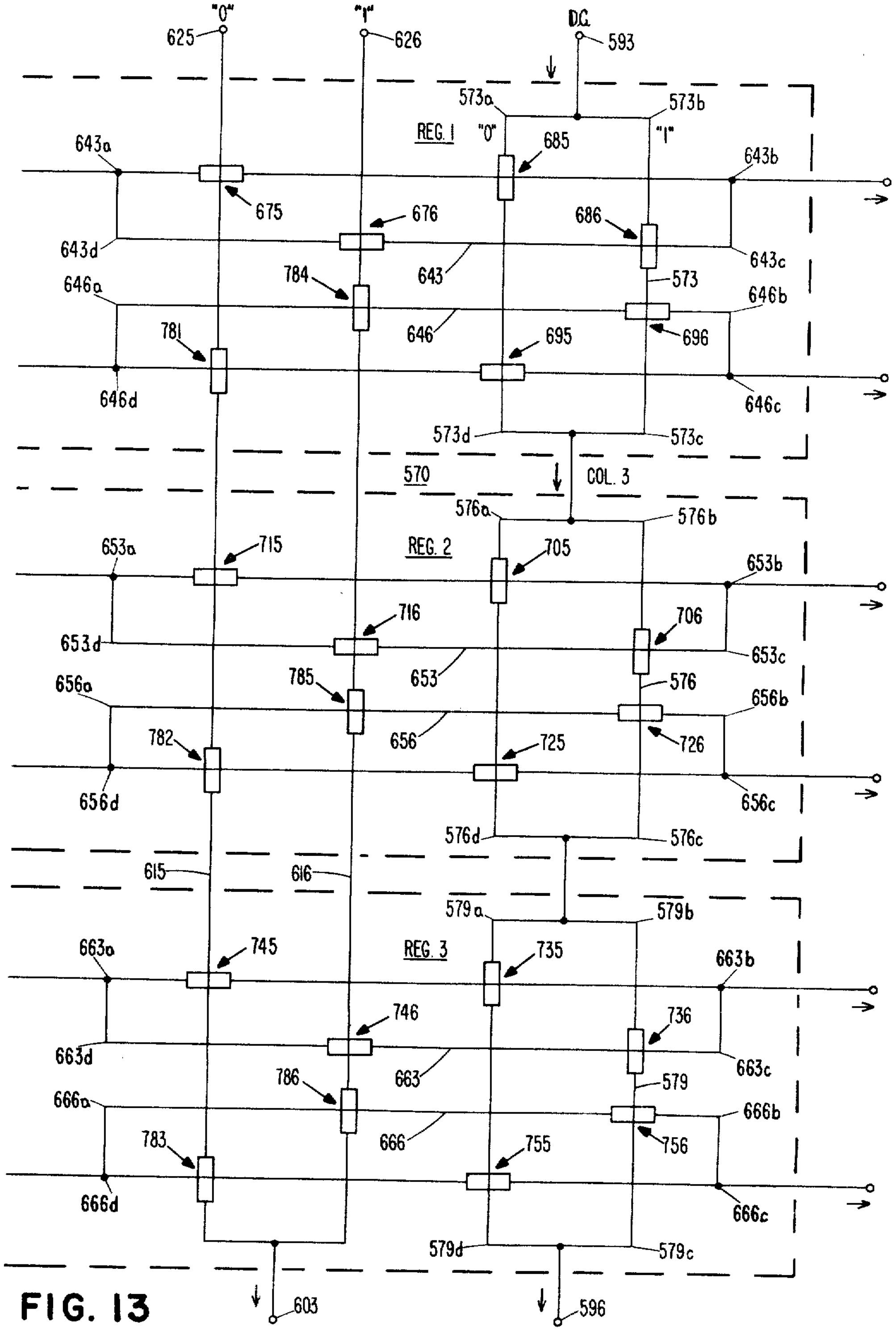
Figure 15:
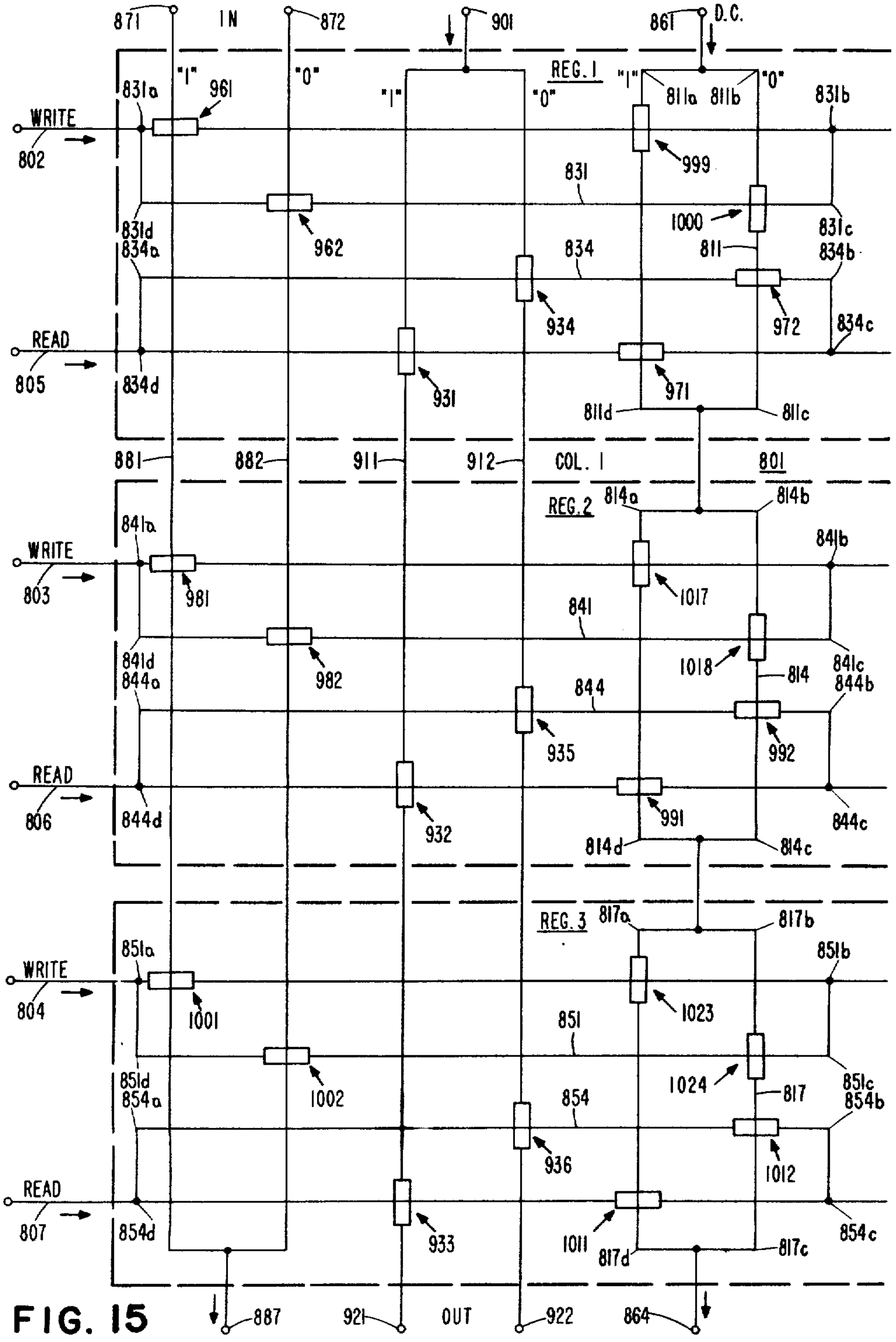
Figure 16:
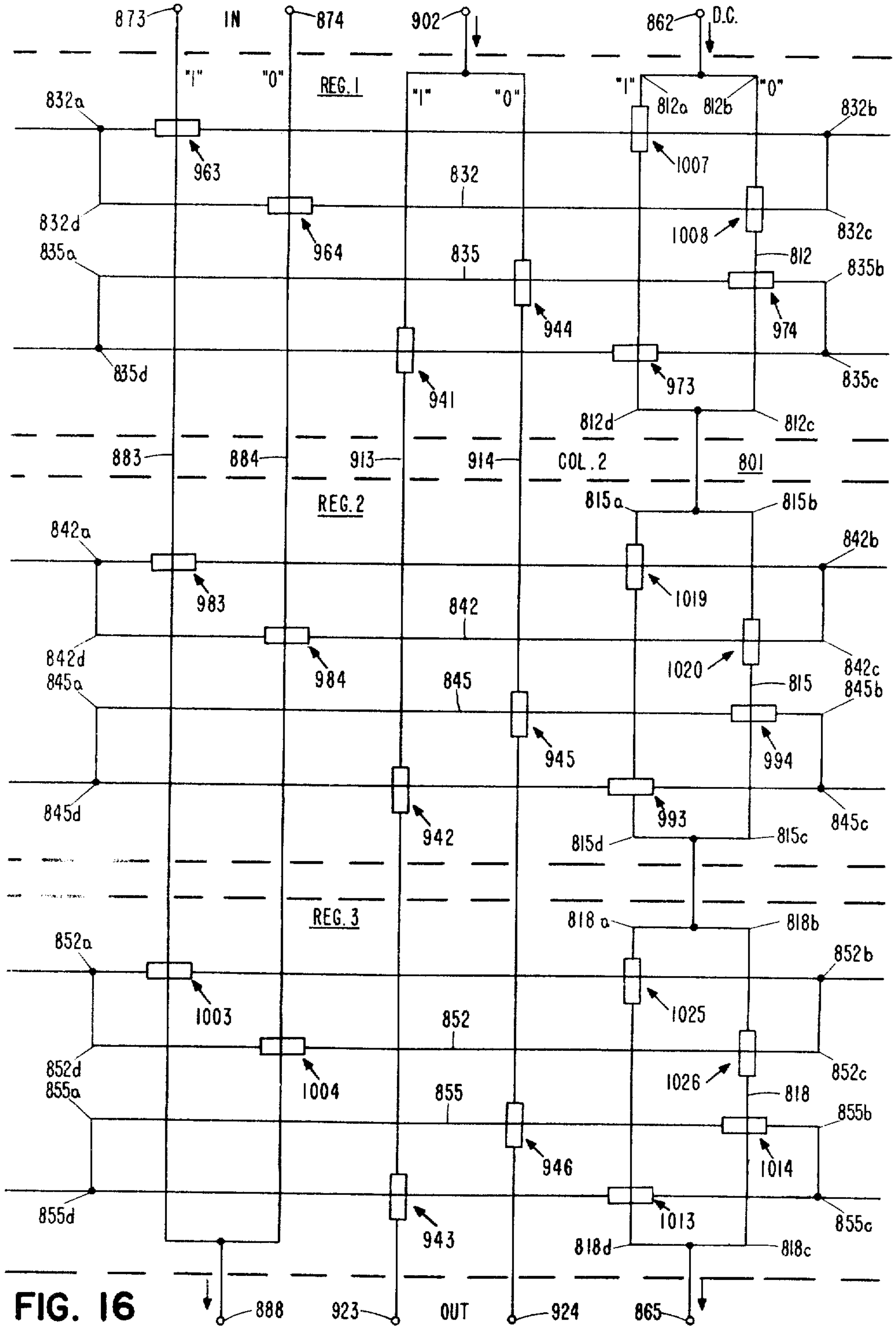
Figure 17:
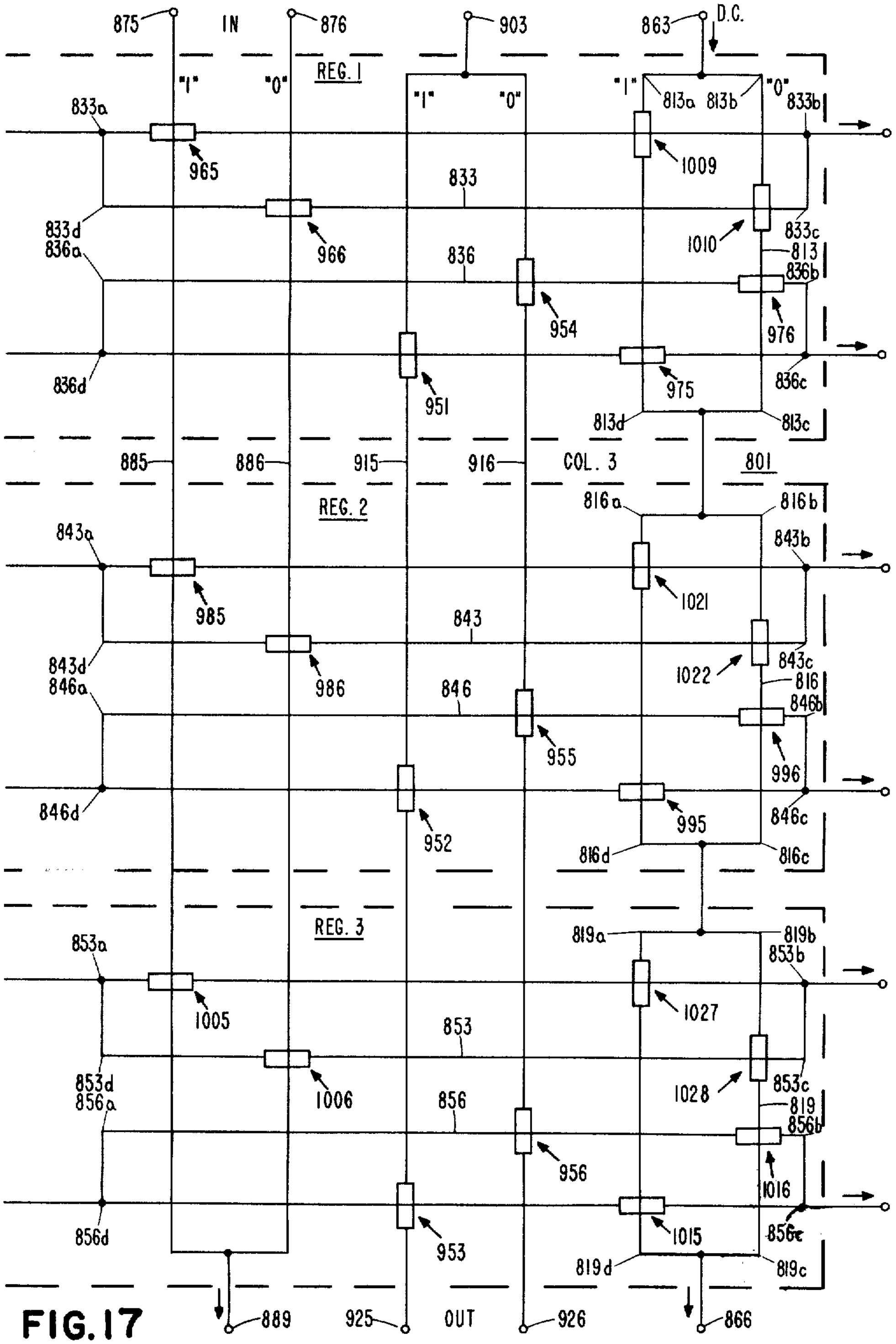
Figure 19:
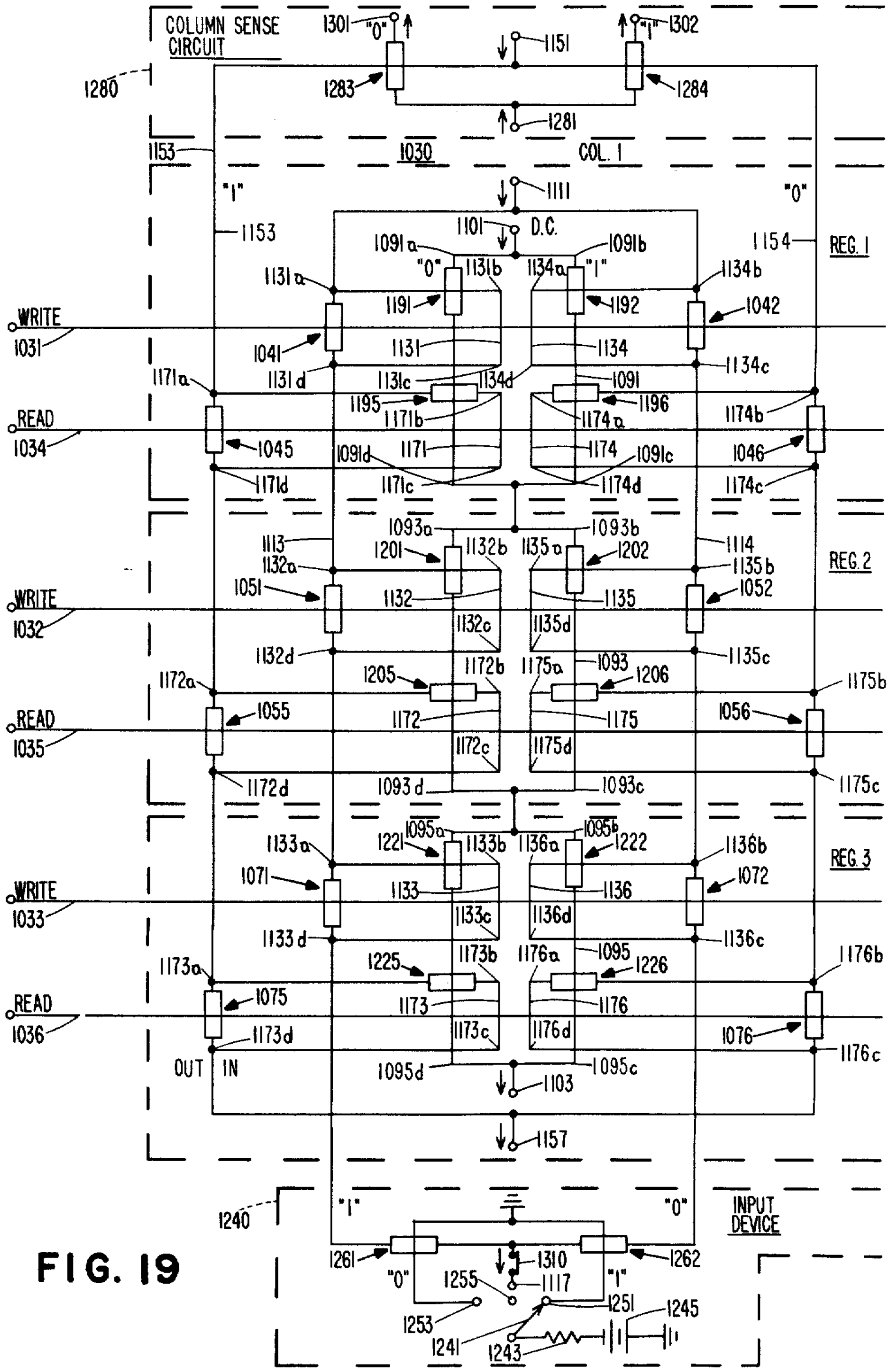
Figure 20:
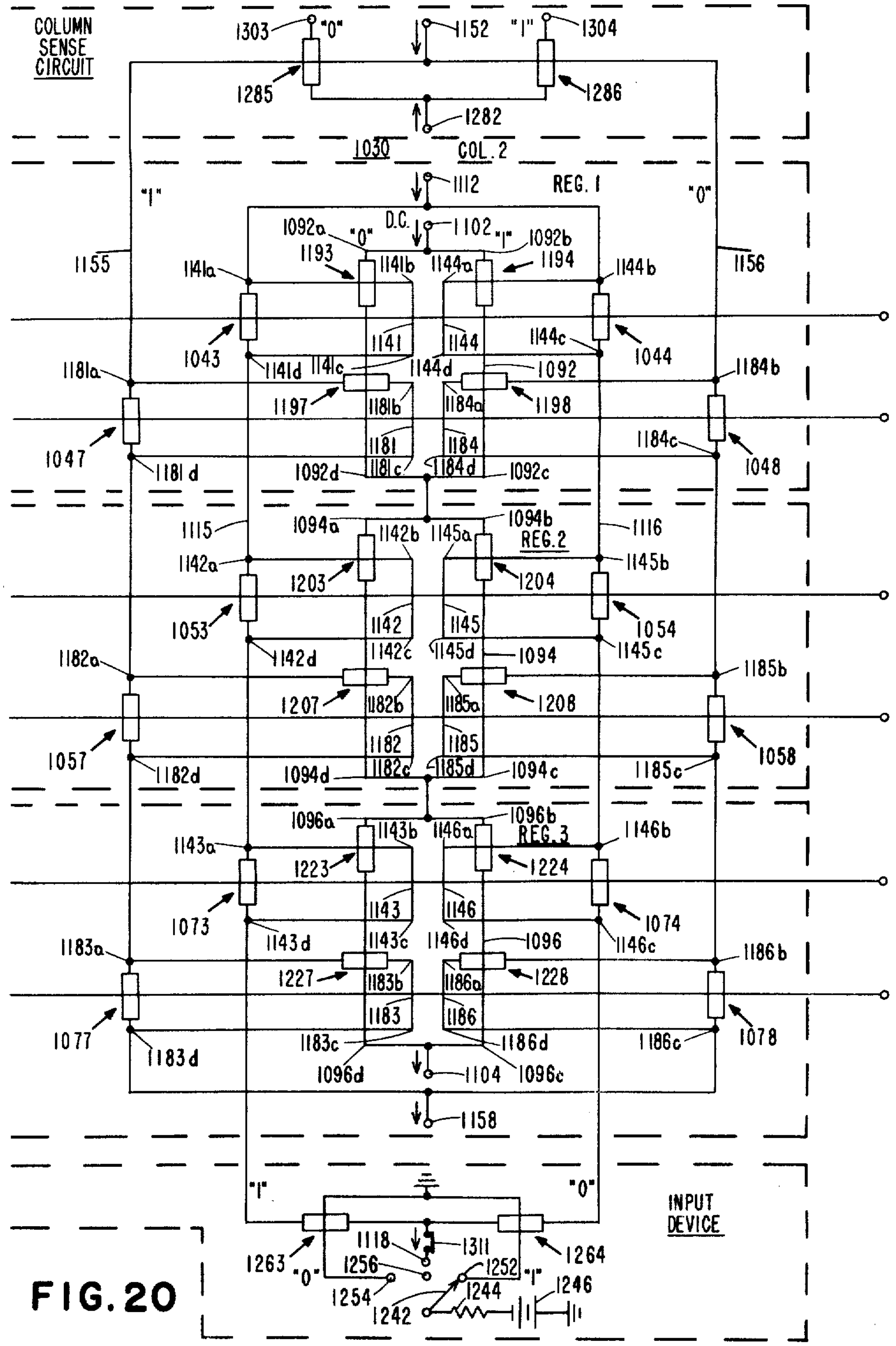

FIG. 10 indicates the manner in which FIGS. 6 through 9 should be arranged;

FIGS. 11 through 13 illustrate a further memory arrangement according to this invention;

FIG. 14 illustrates the manner in which FIGS. 11 through 13 should be arranged;

FIGS. 15 through 17 illustrate yet a further memory arrangement according to this invention;

FIG. 18 shows how FIGS. 15 through 17 should be arranged;

FIGS. 19 and 20 illustrate still a further memory arrangement according to this invention;

FIG. 21 indicates how FIGS. 19 and 20 should be disposed with respect to one another; and FIG. 22 illustrates a storage loop which is employed as the basic storage element throughout various figures of the drawing.

Figure 1:
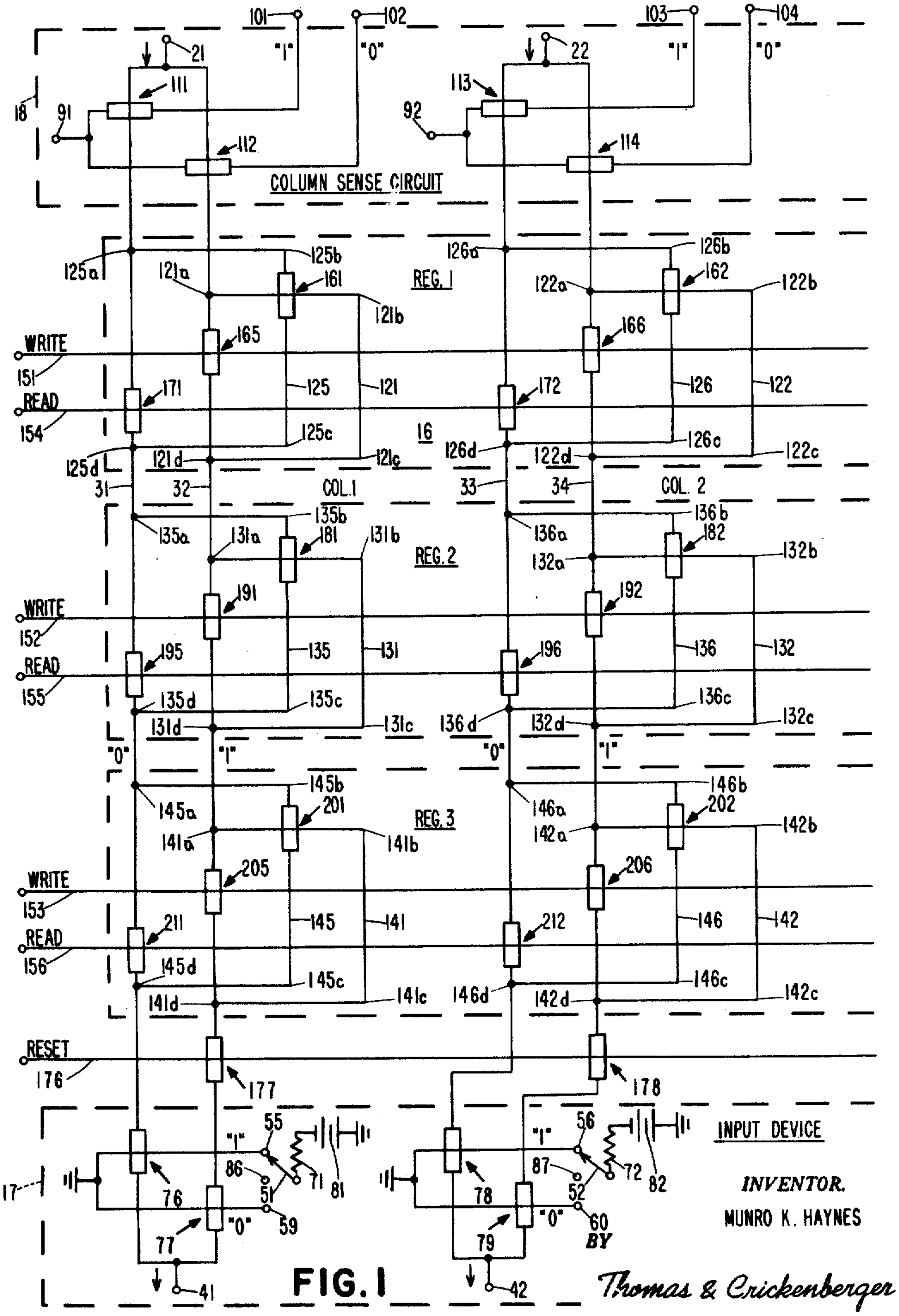
FIGS. 1 and 2 illustrate one memory arrangement according to this invention.
Figure 2:
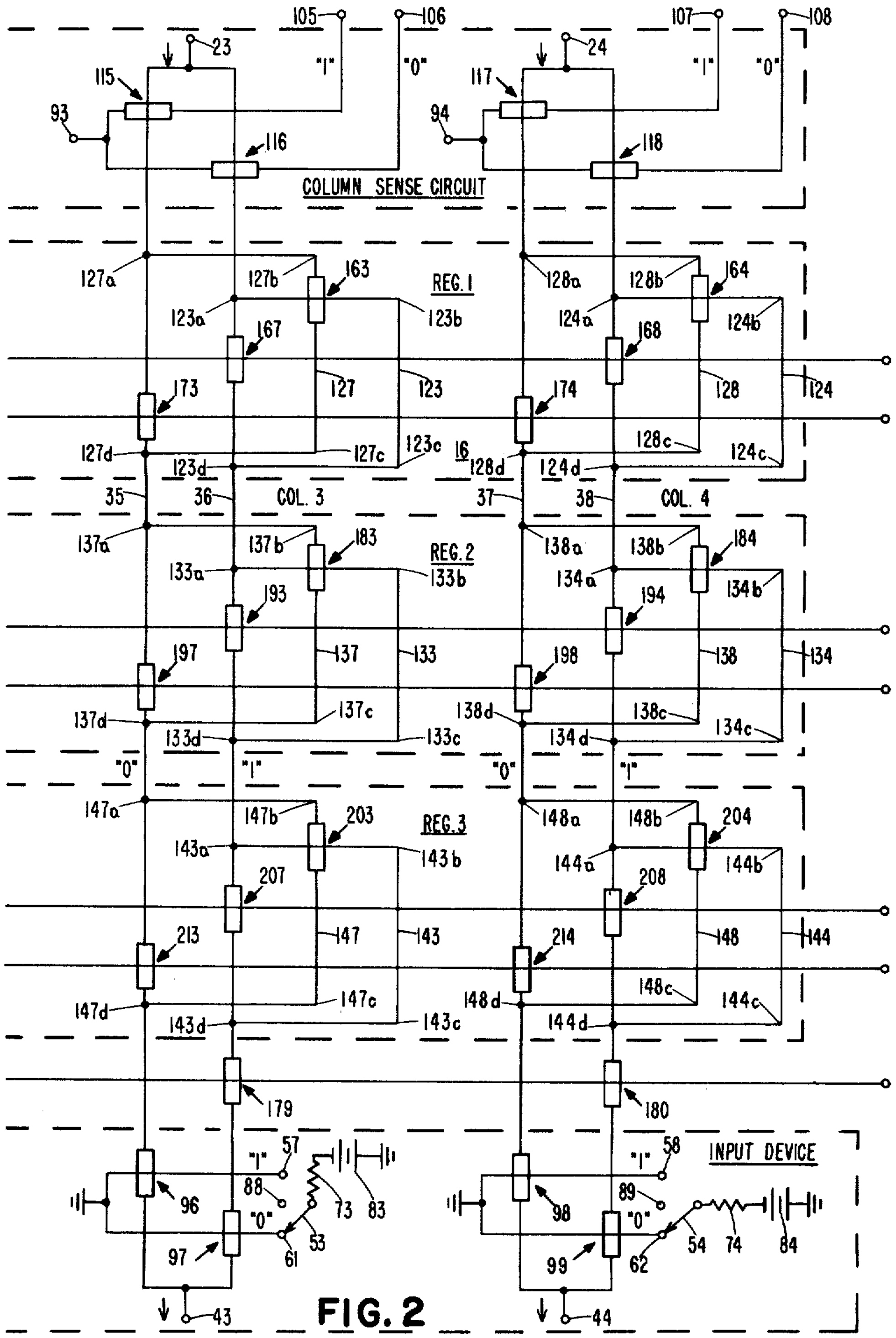
Figure 3:
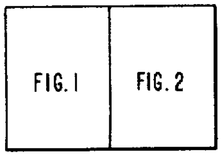
FIG. 3 illustrates the manner in which FIGS. 1 and 2 should be arranged.

Referring now to FIGS. 1 and 2, a memory device is illustrated which includes registers 1 through 3 disposed along the rows of a storage matrix 16 which has columns 1 through 4. FIGS. 1 and 2 should be disposed side by side as indicated in FIG. 3. It is to be understood that the size of the matrix may be changed and that the number of registers as well as the number of storage positions in each register may be increased or decreased as desired. Information is supplied to the array 16 by an input device 17, and information is read from the array 16 to an external utilization device (not illustrated) through a column sense circuit 18.

Currents are supplied at the top of each column to terminals 21 through 24 disposed in the column sense circuit 18, and these currents flow along associated ones of the vertical lines 31 through 38 to exit terminals 41 through 44 disposed at the bottom of each column in the input device 17. Currents in the vertical lines 31 through 38 are controlled by the input device 17 when information is being written in the array 16 and by a selected register when reading from the array 16.

The input device 17 has a plurality of switches 51 through 54 which are closed on respective contacts 55 through 58 to represent a binary one and which are closed on the respective contacts 59 through 62 to represent a binary zero. Connected in series with the switches 51 through 54 are respective resistors 71 through 74 and respective batteries 81 through 84, which serve as current sources. The switches 51 through 54 may be closed on respective center contacts 86 through 89, when the input device 17 is not being utilized, to supply information to the memory array 16. These switches control battery current applied to cryotrons 76 through 79 and 96 through 99.

The column sense circuit 18 includes terminals 91 through 94 which are energized with currents during a readout operation. These currents flow to various ones of the output terminals 101 through 108. Current from the terminal 91 flows through the gate element of either the cryotron 111 or the gate element of the cryotron 112 to associated output terminals 101 or 102. Current from the terminal 92 in column 2 flows through the gate element of either the cryotron 113 or the cryotron 114 to the associated output terminals 103 or 104. Current from the terminal 93 in column 3 flows through the gate element of either the cryotron 115 or the cryotron 116 to the associated output terminals 105 or 106. Current from the terminal 94 in column 4 flows through the gate element of either the cryotron 117 or the cryotron 118 to the associated output terminals 107 or 108.

Register 1 includes storage loops 121 through 124 associated with respective sense loops 125 through 128. Register 2 includes storage loops 131 through 134 associated with respective sense loops 135 through 138. Register 3 includes storage loops 141 through 144 and associated sense loops 145 through 148. Each of the foregoing loops is defined by the points *a*, *b*, *c* and *d* associated with the loop number. Registers 1 through 3 have respective write lines 151 through 153 and respective read lines 154 through 156. The sense loops 125 through 128 in register 1 include respective cryotrons 161 through 164. When the write line 151 of register 1 is energized with a current, it drives the gates of cryotrons 165 through 168 resistive. When the read line 154 of register 1 is energized with a current, it drives the gates of cryotrons 171 through 174 resistive.

The sense loops 135 through 138 of register 2 include respective cryotrons 181 through 184 disposed therein. When the write line 152 is energized, it drives the gates of the cryotrons 191 through 194 resistive, and if the read line 155 is energized with a current, it drives the gates of the cryotrons 195 through 198 resistive. The sense loops 145 through 148 of register 3 include respective cryotrons 201 through 204. If the write line 153 is energized with a current, it drives the gates of cryotrons 205 through 208 resistive, and if the read line 156 is energized with a current, it drives the gates of the cryotrons 211 through 214 resistive. A reset line 176 is energized with a current to perform a reset operation, and this drives the gates of the cryotrons 177 through 180 resistive.

Figure 4:
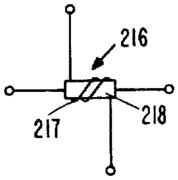
FIG. 4 illustrates a cryotron in schematic form.
Figure 5:
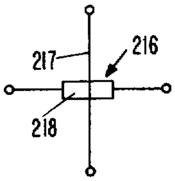
FIG. 5 is a symbol employed throughout the various figures of the drawing to represent the cryotron illustrated schematically in FIG. 4.

Referring next to FIG. 4, a cryotron 216 is illustrated as having a winding 217 disposed about a gate element 218. While this cryotron is represented as a conventional wire-wound cryotron in the interest of providing a more graphic circuit illustration, it is to be understood that the cryotron may be constructed of thin film devices of the type shown and described in copending application Serial No. 625,512, filed on November 30, 1956, by R. L. Garwin and assigned to the assignee of this invention. The circuit schematic of the cryotron 216 in FIG. 4 is depicted in FIG. 5 in a simplified form. The same reference numerals employed in FIG. 4 are used in FIG. 5 to designate corresponding parts. The winding 217 in FIG. 4 is represented in FIG. 5 by the vertical conductor 217 disposed across the gate element 30. The simplified legend of FIG. 5 is employed in FIG. 1, FIG. 2 and other figures of the drawing to represent a cryotron such as schematically illustrated in FIG. 4.

The circuits of this invention are operated at low temperature such as by immersion in liquid helium. The circuit lines or wires and the control coils of each cryotron are made of a hard superconductor such as niobium and the gate element of each cryotron is made of a soft superconductor such as tantalum. The currents employed create a magnetic field in the control coil which exceeds the critical field of the gate, but the magnetic field does not exceed the critical field of the control coil or the connecting lines or wires. Accordingly, the gate element of the cryotron is driven resistive when current flows in the control coil of the cryotron, and the gate element is superconductive when no current flows in the control coil or when a current of magnitude less than critical current of the gate flows in the control coil.

The operation of the superconductive loops used throughout the circuits employed in this application may be understood more readily by making reference to FIG. 22 which is an illustration of such a loop. The loop 2 is defined by points 2*a*, 2*b*, 2*c* and 2*d*. Loop 2 is fed by a current I along line 3. Within the leg 2*d*, 2*a*, a cryotron 1 having a control line 4 is disposed. When the current I is supplied on line 3, the current divides at point 2*d* and proceeds through the parallel branches defined by points 2*d* and 2*a* and points 2*d*, 2*c*, 2*b* and 2*a* to recombine in line 3. The current division in this loop is made in inverse proportion to the inductance of the legs such that the major portion of the current would be in the leg defined by points 2*d* and 2*a*.

When there is no current in the loop, the application of a current thereto produces a current in branch 2*d*, 2*c*, 2*b* and 2*a* which is much less than the current in branch 2*d*, 2*a*. However, because of the superconductive phenomenon the fluxes encircling each of these branches are equal, with a remaining flux encircling the exterior of the superconductive loop. Thus, there is no net flux within the loop 2, and when the current I is terminated all magnetic fluxes disappear.

When the current I is present on line 3 and a current is also present on line 4 to drive the cryotron 1 resistive, all of the current I is forced through branch 2*d*, 2*c*, 2*b* and 2*a*. This gives a net magnetic flux within the superconductive loop 2 proportional to the current I. Therefore, when the current I is terminated and the cryotron 1 is again superconductive, the trapped magnetic flux within the loop 2 induces a persistent current in loop 2 which is now superconductive.

When the loop 2 has a persistent current $I_p$ set up therein, and a current I is subsequently applied to line 3, there will be no current in the leg of the loop defined by points 2*d* and 2*a*. This results because the current I applied to the loop aids the persistent current $I_p$ in that portion of the loop defined by the points 2*a*, 2*b*, 2*c* and 2*d*, but the applied current opposes the persistent current in that portion of the loop defined by points 2*a* and 2*d*. The effect is that the total current in the leg 2*a* and 2*d* is zero while the total current in the leg 2*a*, 2*b*, 2*c* and 2*d* is equal to the applied current I along the vertical line 3. This assumes that the amplitude of the applied current on the line 3 now is equal to the value it had when the persistent current $I_p$ was established earlier. The total current I now appears in the portion of the loop defined by points 2*d*, 2*c*, 2*b* and 2*a*. When the current I on line 3 is terminated, the persistent current $I_p$ is restored in the loop 2. The schematic arrangement of loops illustrated through the drawings is not presumed to represent dimensions of a physical embodiment.

Referring again to FIGS. 1 and 2, the memory array 16 may be operated to transfer information from a selected register in the memory device to any other register in the memory device, to all remaining registers in the memory device, or to any combination of the remaining registers in the memory device. Simultaneously, as any one of the foregoing transfers is made, information may be simultaneously supplied to an external device. Information from the input device, external to the memory device, may be written in a selected register within the memory, in all of the registers in the memory device, or in any combination of the registers in the memory device.

In order to illustrate a writing operation, let it be assumed that the binary word 1100 is to be written in respective columns 1 through 4 of register 3. First, currents are applied to the terminals 21 through 24 at the top of respective columns 1 through 4. Switches 51 through 54 are operated to the positions illustrated in the drawing to represent the binary number 1100. Cryotrons 76 through 79 and 96 through 99 are operated, or not operated, under control of the switches 51 through 54 to represent binary information. For the binary number 1100 battery currents drive resistive the gates of the cryotrons 76, 78, 97 and 99; whereas, the gates of cryotrons 77, 79 96 and 98 remain superconductive. Accordingly, currents from the terminals 21 through 24 in repective columns 1 through 4 flow along respective vertical lines 32, 34, 35 and 37.

Next, the write line 153 of register 3 is energized with a current, and this drives the gates of cryotrons 205 through 208 resistive. Currents on the vertical lines 32 and 34 in respective columns 1 and 2 are diverted by the resistance of the gates of the cryotrons 205 and 206 through that portion of respective loops 141 and 142 defined by the points *a*, *b*, *c* and *d* associated with the loop number. Currents on the vertical lines 35 and 37 are not affected by the current on the write line 153. As soon as the currents are thus diverted in the storage loops 141 and 142, the current on the write line 153 may be terminated. Once the current on the write line 153 is terminated, the currents applied to the terminals 21 through 24 at the top of respective columns 1 through 4 may be terminated. Also, the switches 51 through 54 may be returned to their center contacts 86 through 89, respectively, but it is pointed out the position of these switches is not critical or controlling as long as currents are not applied to the terminals 21 through 24 at the top of respective columns 1 through 4.

Once currents are applied to the terminals 21 through 24, the switches 51 through 54 should be placed on the upper or lower contacts to represent the proper binary information before the write line 153 is energized with a current. Once the currents applied to the terminals 21 through 24 are terminated, persistent currents are established in storage loops 141 and 142 in respective columns 1 and 2 of register 3, but no persistent currents are established in the storage loops 143 and 144 in respective columns 3 and 4 of register 3. It is pointed out that the resistances of the gates 207 and 208 dissipate any currents which may previously have been circulating in respective storage loops 143 and 144 of register 3. A persistent current in a storage loop is arbitrarily assumed to represent binary one, and the absence of a persistent current is arbitrarily assumed to represent binary zero. The binary number 1100 is represented in respective columns 1 through 3 of register 3 by the persistent currents in the storage loops 141 and 142 in respective columns 1 and 2 and the absence of a persistent current in respective storage loops 143 and 144 in respective columns 3 and 4. Thus the binary number 1100 supplied by the input device 17 to the memory array 16 is now written in respective columns 1 through 4 of register 3.

The same binary word 1100 may have been written in registers 1 and 2 at the same time it was written in register 3 merely by energization of respective write lines 151 and 152 at the same time the write line 153 was energized. It is readily seen that the binary word 1100 may have been written in a selected one of the registers 1 through 3, all of the registers 1 through 3, or any combination of the registers 1 through 3. The binary word 1100 written in the array 16 may be supplied to an external device, not illustrated, by energizing the terminals 91 through 94 of the column sense circuit 18 at any time after the switches 51 through 54 of the input device 17 are operated but before the currents supplied to the terminals 21 through 24 are terminated. Currents supplied to the terminals 91 through 94 operate the cryotrons 111 through 118 to represent information in the form of currents flowing to the terminals 101 through 108. The binary word 1100 of the foregoing illustration is represented by currents on the output terminals 101, 103, 106 and 108. This binary word may be presented to a utilization device (not illustrated) simultaneously as the word is written in the memory array 16.

In order to illustrate a transfer operation whereby a word is transferred from one register in memory to another register in memory, let it be assumed that the binary word 1100 is stored in register 3 and that this word is to be transferred to register 2. First, the terminals 21 through 24 are energized with currents. Next, the reset line 176 is energized with a current, and this drives the gates of the cryotrons 177 through 180 resistive. Accordingly, currents from the terminals 21 through 24 are diverted along respective vertical lines 31, 33, 35 and 37 of respective vertical columns 1 through 4. Once the currents are established in these lines, the current applied to the reset line 176 is terminated.

After the current is terminated on the reset line 176, a current is applied to the read line 156 of register 3. This drives the gates of the cryotrons 211 through 214 resistive. Considering first what happens in column 1, the gate of the cryotron 201 in the sense loop 145 of register 3 is driven resistive by the persistent current circulating in the storage loop 141. The gate of the cryotron 211 is driven resistive by the current on the read line 156. Consequently, current from the terminal 21 at the top of column 1 is diverted from the vertical line 31 to the vertical line 32. Current on the vertical line 32 flows through each of the storage loops 121, 131 and 141 and exits through the terminal 41 at the bottom of column 1. The current on the vertical line 32 divides in inverse proportion to the inductance of the parallel paths presented by each storage loop in column 1. Considering more specifically the storage loop 141 in register 3, current flowing to the point **141*a* divides at this point and flows through one path which is defined by the points 141*a* and 141*d* and through another path which is defined by the points 141*a*, 141*b*, 141*c* and 141*d*. The leg 141*a*, 141*d* is smaller than the leg 141*a*, 141*b*, 141*c* and 141*d*. The inductance of the smaller leg is less than the inductance of the larger leg, and as a consequence most of the current on the vertical line 32 flows through the leg 141*a*, 141*d* of the storage loop 141. and a smaller portion of the current on the vertical line 32 flows through the leg 141*a*, 141*b*, 141*c* and 141*d*. The current applied to the loop 141 aids the persistent current in that portion of the loop defined by the points 141*a*, 141*b*, 141*c* and 141*d*, but the applied current opposes the persistent current in that portion of the loop 141*a* and 141*d*. The effect therefore is that the total current flowing in the leg 141*a*, 141*d* is zero while the total current flowing in the leg 141*a*, 141*b*, 141*c* and 141*d* is equal to the applied current flowing along the vertical line 32. This assumes that the amplitude of the applied current on the line 32** is equal now to the value it had when the persistent current was established earlier.

Considering next column 2, the gate of the cryotron 202 is driven resistive by the persistent current in the storage loop 142, and the gate of the cryotron 212 is driven resistive by the current in the read line 156. As a result, the current on the vertical line 33 from the terminal 22 at the top of column 2 is diverted to the vertical line 34. The current on the vertical line 34 flows through the storage loops 122, 132 and 142. The current divides in the loop 142 in the same manner that the current divides in the storage loop 141 in column 1 of register 3. Thus, the current flowing around that portion of the loop 142 defined by the points **142*a*, 142*b*, 142*c* and 142*d* is equal to the applied current flowing on the vertical line 34 while the current flowing through that portion of a storage loop 142 defined by the points 142*a* and 142*d*** is zero.

In columns 3 and 4 of register 3, the gates of the cryotrons 203 and 204 in respective sense loops 147 and 148 of respective columns 3 and 4 remain superconductive since no persistent current flows in respective storage loops 143 and 144. The gates of the cryotrons 213 and 214 are driven resistive by the current on the read line 156. Accordingly, the currents on the vertical lines 35 and 37 of respective columns 3 and 4 are diverted by the resistance of respective cryotrons 213 and 214 through that portion of respective sense loops 147 and 148 defined by the points *a*, *b*, *c* and *d* associated with the loop number. The currents on the vertical lines 35 and 37 in respective columns 3 and 4 continue to flow on these lines. It is seen therefore that the result of energizing the read line 156 of register 3 with a current is to divert currents from the terminals 21 and 22 at the top of respective columns 1 and 2 to respective vertical lines 32 and 34, but current from the terminals 23 and 24 at the top of respective columns 3 and 4 is not diverted from the vertical lines 35 and 37. If the information held in register 3 is to be supplied to a utilization device external to the memory array 16, currents may be applied at this time to terminals 91 through 94 in the column sense circuit 18, and these currents flow through the superconductive gates of cryotrons 111, 113, 116 and 118 to respective terminals 101, 103, 106 and 108. Current to these terminals represents the binary number 1100.

The write line 152 of register 2 is then energized with a current, and this drives the gates of cryotrons 191 through 194 resistive. Current on the vertical line 32 in column 1 is diverted by the resistance of the gate of the cryotron 191 through that portion of the storage loop 131 defined by the points 131*a*, 131*b*, 131*c* and 131*d*. In like fashion the current on the vertical line 34 in column 2 is diverted through that portion of the storage loop 132 in register 2 defined by the points 132*a*, 132*b*, 132*c* and 132*d*. There is no current flowing on the vertical lines 36 and 38 of respective columns 3 and 4, and the resistance of the cryotrons 193 and 194 dissipates any current which may have been circulating in respective storage loops 133 and 134.

Once the currents have been thus diverted in the storage loops 131 and 132 in respective columns 1 and 2 of register 2, the current on the write line 152 may be terminated. The current on the read line 156 in register 3 may be terminated at this time if it was not earlier terminated. Upon termination of a write current on the line 152, the gates of the cryotrons 191 and 192 return to their superconductive state, but currents on the vertical lines 32 and 34 in respective columns 1 and 2 continue to flow in that portion of the associated loops 131 and 132 defined by the points *a*, *b*, *c* and *d* associated with the loop number. This is true because current flowing in one of two parallel superconductive paths does not change unless forced to do so.

At this time currents applied to the terminals 21 through 24 at the top of respective columns 1 through 4 may be terminated, and upon termination of these currents, persistent currents are established in the storage loops 131 and 132 in respective columns 1 and 2 of register 2, but no persistent currents are established in storage loops 133 and 134 of respective columns 3 and 4 of register 2. Thus, it is seen that the binary word 1100 is represented in respective storage loops 131 through 134 of register 2. The binary word 1100 may have been stored in register 1 at the same time it was stored in register 2 merely by energizing the write line 151 at the same time the write line 152 in register 2 was energized. Thus, it follows that a word stored in a selected register may be transferred within the memory device to any other register, to all other registers, or to any combination of all of the other registers. Furthermore, a word thus transferred may be supplied simultaneously to a device external to the memory.

Referring next to FIGS. 6 through 9, a memory array 220 is illustrated wherein a writing operation may take place simultaneously with either one or two reading operations. FIGS. 6 through 9 should be arranged side by side as indicated in FIG. 10. Registers 1 through 3 are disposed along the three rows of the memory array 220 which is shown as having four columns. It is to be understood that the number of rows and the number of columns may be increased or decreased as desired. An input device 221 is employed to supply signals representative of information to the memory array 220. The input device 221 includes switches 222 through 225 which are closed to represent binary ones and are open to represent binary zeros. Connected to the switches 222 through 225 are respective resistors 232 through 235 which in turn are connected to respective batteries 242 through 245. Currents are supplied to the vertical lines 252 through 255 by respective batteries 242 through 245.

Register 1 includes storage loops 261 through 264 which are coupled to respective sense loops 271 through 274 and to respective sense loops 281 through 284. Register 2 includes storage loops 291 through 294 coupled to respective sense loops 301 through 304 and to respective sense loops 311 through 314. Register 3 includes storage loops 321 through 324 coupled to respective sense loops 331 through 334 and to respective sense loops 341 through 344. Registers 1 through 3 have respective write lines 351 through 353. Registers 1 through 3 have respective read 1 lines 355 through 357 and respective read 2 lines 361 through 363. The sense loops 271 through 274 of register 1 include respective cryotrons 371 through 374, and the sense loops 281 through 284 include respective cryotrons 381 through 384. When the write line 351 of register 1 is energized with a current, it drives the gates of the cryotrons 391 through 394 resistive. When the read 1 line 355 is energized with a current, it drives the gates of the cryotrons 401 through 404 resistive. If the read 2 line 361 is energized with a current, it drives resistive the gates of the cryotrons 411 through 414.

The sense loops 301 through 304 of register 2 include respective cryotrons 421 through 424, and the sense loops 311 through 314 include respective cryotrons 431 through 434. When the write line 352 is energized with a current, it drives the gates of cryotrons 441 through 444 resistive. When the read 1 line 356 is energized with a current, it drives resistive the gates of the cryotrons 451 through 454. If the read 2 line 362 is energized with a current, it drives resistive the gates of the cryotrons 461 through 464.

The sense loops 331 through 334 of register 3 include respective cryotrons 471 through 474, and the sense loops 341 through 344 include respective cryotrons 481 through 484. If the write line 353 of register 3 is energized with a current, it drives resistive the gates of cryotrons 491 through 494. When the read 1 line 357 is energized with a current, it drives resistive the gates of cryotrons 501 through 504. If the read 2 line 363 is energized with a current, it drives resistive the gates of cryotrons 511 through 514.

Whenever a selected one of the registers 1 through 3 undergoes a read operation as a result of energizing the associated read 1 line, currents applied to terminals 521 through 524 at the bottom of respective columns 1 through 4 are caused to flow along various ones of the vertical lines 531 through 538. Whenever a read operation takes place as a result of energizing a selected read 2 line, currents from terminals 541 through 544 at the bottom of respective columns 1 through 4 flow along various ones of the vertical lines 551 through 558. A current pulse on the reset line 560 drives resistive the gates of cryotrons 561, 563, 565 and 567, and a current on the reset line 569 drives resistive the gates of cryotrons 562, 564, 566 and 568.

The memory device in FIGS. 6 through 9 adds flexibility in that two different registers within the memory may be read out in parallel at the same time to two load devices, and a new word may be written into yet another register of the memory. Three external devices may be operated simultaneously in conjunction with the memory device, and three different registers within the memory device may be simultaneously employed, one for a write operation and two for read operations. Various combinations of the foregoing operations may take place either at different times or simultaneously.

For the purpose of illustrating a writing operation in the memory device of FIGS. 6 through 9, let it be assumed that the binary word 1100 is to be supplied by the input device 221 and that this information is to be stored in respective columns 1 through 4 of register 2. The switches 222 through 225 normally remain in the open position as illustrated in the drawings. In the open position the switches represent binary zeros, and in the closed position the switches represent binary ones. Accordingly, the switches 222 and 223 are closed to represent binary one, and the switches 224 and 225 are left open to represent binary zero. As a consequence, currents are established on vertical lines 252 and 253 in respective columns 1 and 2, and no currents are supplied on the vertical lines 254 and 255 in respective columns 3 and 4.

Next, the write line 352 is energized with a current, and this drives the gates of cryotrons 441 through 444 resistive. Currents flowing in the vertical lines 252 and 253 of respective columns 1 and 2 are diverted through that portion of the storage loops 291 and 292 defined by the points *d, c, b* and *a* associated with the loop number. This diversion takes place within the loops 291 and 292 because the gates of respective cryotrons 441 and 442 are resistive. No current flows in the vertical lines 254 and 255, and the resistive gates of the cryotrons 443 and 444 dissipate any persistent currents which may have been circulating in respective storage loops 293 and 294. At this point the current on the write line 352 may be terminated.

Subsequent to the termination of the current on the write lines 352, all of the switches 222 through 225 are opened, and they are left in the open position. Consequently, persistent currents are established in the storage loops 291 and 292, but no persistent current is established in the storage loops 293 and 294. It is seen therefore that binary ones are represented in the storage loops 291 and 292 by the persistent currents circulating therein, and binary zero is represented in the storage loops 293 and 294 by the absence of persistent currents circulating therein. Thus, the binary word 1100 is written in respective columns 1 through 4 of register 2. It is readily seen that this same binary word may have been written in registers 1 or 3 merely by energizing the write lines 351 or 353. The binary word 1100 may have been written in all or any combination of all of the registers in the memory device of FIGS. 6 through 9.

In order to illustrate a read operation from one register to an external device and a read operation from another register to an external device, let it be assumed that register 2 is to be read to one external device and that register 3 is to be read to another external device. In the interest of simplicity let it be assumed further that the binary word 1100 is stored in respective columns 1 through 4 of both register 2 and register 3. Arbitrarily let it be assumed that vertical lines 531 through 538 are to be used to transfer the word in register 2 to an external device and that the vertical lines 551 through 558 are to be employed to transfer the content of register 3 to another external device. First, currents are applied to terminals 521 through 524 at the bottom of respective columns 1 through 4 and to terminals 541 through 544 at the bottom of respective columns 1 through 4. Next, the reset lines 560 and 569 are energized, and this drives the gates of the cryotrons 561 through 568 resistive. Consequently, currents from the terminals 521 through 524 and 541 through 544 are diverted along respective vertical conductors 532, 534, 536, 538 and 552, 554, 556 and 558. Once these currents are thus diverted, current on the reset lines 560 and 569 are terminated. The currents on the lines 532, 534, 536, 538, 552, 554, 556 and 558 continue to flow in these lines. This is because current flowing in one of two parallel superconductive paths continues to flow in that path unless forced to change.

Next, the read 1 line 356 of register 2 and the read 2 line 363 of register 3 are energized with currents. In register 2, the current on the read 1 line 356 drives the gates of the cryotrons 451 through 454 resistive. In column 1 of register 2, the persistent current circulating in the storage loop 291 drives the gate of the cryotron 421 resistive, and the current in the read 1 line 356 drives the gate of cryotron 451 resistive. As a result the current from the terminal 521 at the bottom of column 1 is diverted from the vertical line 532 to the vertical line 531.

In column 2 of register 2, the storage loop 292 has a persistent current circulating therein which drives the gate of the cryotron 422 resistive, and the current in the read 1 line 356 drives the gate of the cryotron 452 resistive. As a result the current from the terminal 522 is diverted from the vertical line 534 to the vertical line 533.

The storage loop 293 in column 3 of register 2 has no persistent current therein, and the gate of the cryotron 423 remains superconductive. The current in the read 1 line 356 of register 2 drives the gate of the cryotron 453 resistive, and this diverts the current on the vertical line 536 through that portion of the sense loop 303 defined by the points 303*d*, 303*c*, 303*b* and 303*a*. From the point 303*a* the current on the vertical line 533 flows upwardly through the sense loop 273, dividing there in inverse proportion to the inductance of the two parallel paths, and ultimately flows to a load device not illustrated. In column 4 of register 2 the storage loop 294 has no persistent current circulating therein, and the gate of the cryotron 424 is superconductive. The gate of the cryotron 454 is driven resistive by the current on the read 1 line 356, and this diverts current on the vertical line 538 through that portion of the sense loop 304 defined by the points 304*d*, 304*c*, 304*b* and 304*a*. From the point 304*a* current flows upwardly through the sense loop 274 and to a load device not illustrated. It is seen therefore that the load device connected to the vertical lines 531 through 538 receives current on vertical lines 531, 533, 536 and 538. Currents on these lines represent the binary number 1100.

Considering next what happens in register 3, the current on the read 2 line 363 drives the gates of the cryotrons 511 through 514 resistive. Referring more specifically to column 1 of register 3, the persistent current circulating in the storage loop 321 drives the gate of the cryotron 481 resistive. The gate of the cryotron 511 is driven resistive by the current flowing on the read 2 line 363. Consequently, current is diverted from the vertical line 551 to the vertical line 552. Considering next column 2 of register 3, the persistent current in the storage loop 322 drives the gate of the cryotron 482 resistive, and the current in the read 2 line 363 drives the gate of the cryotron 512 resistive. Accordingly, current from the terminal 542 is diverted from the vertical line 553 to the vertical line 554.

Referring more specifically to column 3 of register 3, the storage loop 323 has no persistent current therein, and the gate of the cryotron 483 is superconductive. The gate of the cryotron 513 is driven resistive by current on the read 2 line 363. Thus, current from the terminal 543 is diverted through that portion of the sense loop 343 defined by the points 343*c*, 343*d*, 343*a* and 343*b*. From the point 343*b* current continues to flow upwardly in the vertical line 555 through the sense loops 313 and 283 to a load device not shown.

In column 4 of register 3 the gate of the cryotron 484 is superconductive because there is no persistent current in the storage loop 324. The gate of the cryotron 514 is driven resistive because current flows in the read 2 line 363. Consequently, current from the terminal 544 is diverted through that portion of the sense loop 344 defined by the points 344*c*, 344*d*, 344*a* and 344*b*. From the point 344*b* current continues to flow upwardly in the vertical line 557 through the sense loops 314 and 284 to a load device not illustrated. It is seen therefore that a second load device connected to the vertical lines 551 through 558 receives current on the vertical lines 552, 554, 555 and 557. Currents on these lines represent the binary number 1100.

It is pointed out that the binary word 1100 stored in registers 1 and 2 is read out from these registers simultaneously. Once the information is received by the two load devices on the vertical lines 531 through 538 and 551 through 558, the currents on the read 1 line 356 in register 2 and the read 2 line 363 in register 3 may be terminated. Also, currents applied to the terminals 521 through 524 and 541 through 544 may be terminated. It is readily seen that information may be transferred from registers 1 and 2 or from registers 1 and 3 in the same fashion that the information was transferred from registers 2 and 3 merely by energizing the selected combination of read lines to these registers.

While any one register or any two registers are being read out in parallel from the memory device of FIGS. 6 through 9, simultaneously a different register may be employed in a writing operation whereby information from the input device 221 may be stored therein. Accordingly, three registers of the memory device may be involved simultaneously with external devices, two of the registers being read from and one of the registers being written into.

Referring next to FIGS. 11, 12 and 13, a memory array 570 is illustrated as having three columns and three rows. FIGS. 11 through 13 should be arranged side by side as indicated in FIG. 14. Registers 1 through 3 are disposed along the rows. It is to be understood that the memory array 570 may be increased in size or decreased in size as desired. Register 1 includes the storage loops 571 through 573; register 2 includes the storage loops 574 through 576; and register 3 includes the storage loops 577 through 579. Each of the storage loops 571 through 579 is defined by the points *a*, *b*, *c* and *d* associated with the loop number. Currents are supplied to the storage loops of register 1 through 3 through the terminals 591 through 593 at the top of columns 1 through 3, and these currents exit through corresponding terminals 594 through 596 at the bottom of respective columns 1 through 3. Currents applied to the terminals 591 through 593 are direct currents which remain on as long as the array 570 is in operation.

During a read operation currents are applied to terminals 601 through 603 at the bottom of respective columns 1 through 3, and these currents flow along various ones of the vertical lines 611 through 616. Currents on the lines 612, 614 and 616 represent binary ones. Currents on the vertical lines 611, 613 and 615 represent binary zeros. Currents on the lines 611 through 616 are supplied to corresponding terminals 621 through 626 which may be connected to a load device not illustrated. During a write operation currents are supplied to the vertical lines 611 through 616 by an input device, not shown, which may be connected to terminals 621 through 626.

Registers 1 through 3 have respective write lines 631 through 633 and respective read lines 634 through 636. The write line 631 in register 1 includes control loops 641 through 643, and the read line 634 includes sense loops 644 through 646. The write line 632 in register 2 includes control loops 651 through 653, and the read line 635 includes sense loops 654 through 656. The write line 633 of register 3 includes control loops 661 through 663, and the read line 636 includes sense loops 664 through 666. Each of the foregoing sense loops is defined by the points *a*, *b*, *c* and *d* associated with the loop number.

The control loop 641 in column 1 of register 1 includes cryotrons 671 and 672; the control loop 642 in column 2 of register 1 includes cryotrons 673 and 674; and the control loop 643 in column 3 of register 1 includes cryotrons 675 and 676. The storage loop 571 in column 1 includes cryotrons 681 and 682; the storage loop 572 in column 2 of register 1 includes cryotrons 683 and 684; and the storage loop 573 in column 3 of register 1 includes the cryotrons 685 and 686. The sense loop 644 in column 1 of register 1 includes cryotrons 691 and 692; the sense loop 645 in column 2 of register 1 includes cryotrons 693 and 694; and the sense loop 646 in column 3 of register 1 includes cryotrons 695 and 696.

The storage loop 574 in register 2 includes cryotrons 701 and 702; the storage loop 575 in column 2 of register 2 includes cryotrons 703 and 704; and the storage loop 576 in column 3 of register 2 includes cryotrons 705 and 706. The control loop 651 in column 1 of register 2 includes cryotrons 711 and 712; the storage loop 652 in column 2 of register 2 includes cryotrons 713 and 714; and the control loop 653 in column 3 of register 2 includes cryotrons 715 and 716. The sense loop 654 in column 1 of register 2 includes cryotrons 721 and 722; the sense loop 655 in column 2 of register 2 includes cryotrons 723 and 724; and the sense loop 656 in column 3 of register 2 includes cryotrons 725 and 726.

The storage loop 577 in column 1 of register 3 includes cryotrons 731 and 732; the storage loop 578 in column 2 of register 3 includes cryotrons 733 and 734; and the storage loop 579 in column 3 of register 3 includes cryotrons 735 and 736. The control loop 661 in column 1 of register 3 includes cryotrons 741 and 742; the control loop 662 in column 2 of register 3 includes cryotrons 743 and 744; and the control loop 663 in column 3 of register 3 includes cryotrons 745 and 746. The sense loop 664 in column 1 of register 3 includes cryotrons 751 and 752; the sense loop 664 in column 2 of register 3 includes cryotrons 753 and 754; and the sense loop 666 in column 3 of register 3 includes cryotrons 755 and 756.

The vertical line 611 in column 1 includes cryotrons 761 through 763 and the vertical line 612 includes cryotrons 764 through 766. The vertical line 613 in column 2 includes cryotrons 771 through 773, and the vertical line 614 includes cryotrons 774 through 776. The vertical line 615 in column 3 includes cryotrons 781 through 783, and the vertical line 616 in column 3 includes cryotrons 784 through 786.

Information from an external device may be written into the memory device of FIGS. 11 through 13, or information stored in the memory device of FIGS. 11 through 13 may be read to an external device. Information in one register of the memory may be transferred to any one of the remaining registers within the memory, to all of the remaining registers within the memory, or to any combination of the remaining registers within the memory.

In order to illustrate a writing operation, let it be assumed that the binary word 110 is to be written in respective columns 1 through 3 of register 2. First, the array is placed in the operative condition by applying D.C. currents to terminals 591 through 593 of respective columns 1 through 3, and these currents remain on as long as the memory device remains in operation. Next, information signals are supplied to the vertical lines 621 through 626. In order to represent the binary information 110, the vertical lines 622, 624 and 625 are energized with currents. Information is represented in each column by a current on one of the two vertical lines, one of which represents binary zero and the other binary one. In column 1, for example, a binary one is represented by a current on the vertical line 612, and a binary zero is represented by a current on the vertical line 611. Only one of the two lines is energized at any one time.

A current is applied next to the write line 632 of register 2. Current on the vertical line 612 drives resistive the gate of the cryotron 712 in column 2 of register 2. Consequently, current on the write line 632 is diverted from that portion of the control loop 651 defined by the points *a*, *d*, *c* and *b*, and the current flows in that portion of the control loop 651 defined by the points 651*a* and 651*b*. Current flowing in this leg of the control loop 651 drives the gate of cryotron 701 resistive, and current from the terminal 591 at the top of column 1 is diverted through the right-hand portion of the storage loop 574 defined by the points 574*b* and 574*c*. Current flowing in the right-hand portion of the storage loop 574 is arbitrarily assumed to represent a binary one; whereas, current flowing in the left-hand portion of the loop 574 defined by the points 574*a* and 574*d* is arbitrarily assumed to represent a binary zero.

Thus a binary one is written in the storage loop 574 in column 1 of register 2.

The current on the write line 632 continues to the right to the control loop 652 in column 2 of register 2. The current flowing in the vertical line 614 drives the gate of the cryotron 714 in the control loop 652 resistive, and current on the write line 632 flowing to the point 652*a* is caused to flow through that portion of the control loop 652 defined by the points 652*a* and 652*b*. Consequently, the gate of the cryotron 703 is driven resistive by the current on the write line 632 flowing in the upper leg of the control loop 652 defined by the points 652*a* and 652*b*. Because the gate of the cryotron 703 is driven resistive, current from the terminal 592 at the top of column 2 is diverted in the storage loop 575 through the right-hand portion defined by the points 575*b* and 575*c*. Current flowing in the right-hand portion of the storage loop 575 represents a binary one.

Considering next column 3 of register 2, current in the vertical line 615 drives the gate of the cryotroon 715 resistive, and current entering the control loop 653 from the left is diverted at the point 653*a* through that portion of the loops 653 defined by the points 653*a*, 653*d*, 653*c* and 653*b*. From the point 653*b* current exits to the right on the line 632. The current flowing in that portion of the control loop 653 defined by the points 653*a*, 653*d*, 653*c* and 653*b* drives the gate of the cryotron 706 resistive and diverts current flowing from the terminals 593 to the storage loop 576 through that portion of this storage loop defined by the points 576*a* and 576*d*. Current flowing in the left-hand portion of the storage loop 576 represents a binary zero.

The currents flowing in the right-hand portions of the storage loops 574 and 575 in respective columns 1 and 2 of register 2 represent binary ones, and the currents flowing in the left-hand portion of the storage loop 576 represents a binary zero. Accordingly, the binary word 110 is written in respective columns 1 through 3 of register 2. At this point the current on the write line 632 may be terminated, and information signals represented by currents applied to the terminals 621 through 626 may be terminated. It is readily seen that the binary word 110 may have been written in register 1 or in register 3 at the same time it was written in register 2 by energizing the write line 631 of register 1 or the write line 633 of register 3. Furthermore the binary word 110 may have been written in registers 1 through 3 by energizing the write lines of each register in the same manner as the write line 632 was energized in the foregoing illustration.

For the purpose of illustrating a transfer operation of information in one register to another register, assume that the binary word 110 is stored in register 2 and that this information is to be stored in register 1. Currents to the terminals 591 through 593 are presumed to have been turned on at an earlier time. First, currents are applied to the terminal 601 through 603 at the bottom of respective columns 1 through 3. Next, a current is applied to the read line 635 of register 2. Finally, a current is applied to the write line 631 of register 1. It is permissible to energize the terminals 601 through 603, the read line 635 of register 2 and the write line 631 of register 1 simultaneously.

Considering first column 1 of register 2, the current in the right-hand portion of the storage loop 574 drives the gate of the cryotron 722 resistive, and current on the read line 635 is diverted through that portion of the control loop 654 defined by the points 654*d* and 654*c*. Current in this portion of the control loop 654 drives the gate of the cryotron 762 resistive and diverts current from the terminal 601 at the bottom of column 1 to the vertical line 612. Current on the vertical line 612 drives the gate resistive of the cryotron 672 in the control loop 641 in column 1 of register 1. Consequently, current on the write line 631 is caused to flow through that portion of the control loop 641 defined by the points 641*a* and 641*b*. Current in this portion of the control loop 641 drives the gate of the cryotron 681 resistive and diverts current from the terminal 591 through the right-hand portion of the storage loop 571 defined by the points 571*b* and 571*c*. Current flowing in this portion of the storage loop 571 represents a binary one. It is seen therefore that the binary one stored in the storage loop 574 in register 2 is transferred to the storage loop 571 of register 1.

Considering next column 2, current flowing in that portion of the storage loop 575 defined by the points 575*b* and 575*c* represents a binary one, and it drives the gate of the cryotron 724 resistive. Consequently, current entering the control loop 655 at the point 655*d* is diverted through that portion of the control loop 655 defined by the points 655*d* and 655*c*. This current drives resistive the gate of the cryotron 772 and diverts current from the terminal 602 at the bottom of column 2 to the vertical line 614. Current on the vertical line 614 drives resistive the gate of the cryotron 674 in the control loop 642 in column 2 of register 1. As a result the current along the line 631 flowing into the control loop 642 from the left is diverted through the path 642*a* and 642*b* of the control loop 642. This current drives the gate of the cryotron 683 resistive and diverts current from the terminal 592 through the right-hand portion of the storage loop 572 defined by the points 572*b* and 572*c*. Current flowing in this portion of the storage loop 572 represents a binary one. It is seen therefore that the binary one stored in the storage loop 575 in column 2 of register 2 is now transferred to the storage loop 572 in column 2 of register 1.

The current flowing in the left-hand portion 576*a* and 576*b* of the storage loop 576 drives the gate of the cryotron 725 resistive. Consequently, current flowing into the control loop 656 from the left is diverted through that portion of the control loop 656 defined by the points 656*d*, 656*a*, 656*b* and 656*c*. This current drives resistive the gate of the cryotron 785 and diverts current from the terminal 603 at the bottom of column 3 to the vertical line 615. Current on the vertical line 615 drives resistive the gate of the cryotron 675 in the control loop 643 in column 3 of register 1. Accordingly, current flowing to the control loop 643 from the left is diverted through that portion of this control loop defined by the points 643*a*, 643*d*, 643*c* and 643*b*. This current drives resistive the gate of the cryotron 686 and diverts current from the terminal 593 through the left-hand portion of the storage loop 573 defined by the points 573*a* and 573*d*. Current in this portion of the loop 573 represents a binary zero. Accordingly, it is seen that the binary zero stored in the storage loop 576 of register 2 is transferred to the storage loop 573 of register 1. Accordingly, the binary word 110 stored in respective columns 1 through 3 of register 2 is transferred to respective columns 1 through 3 of register 1.

The information read from register 2 and written in register 1 may also be supplied to a load device via the lines 621 through 626. Note that current at this point flows on vertical lines 612, 614 and 615. The information represented by these currents is the binary word 110. Accordingly, the binary word transferred from one register in the memory array 570 to another register in the memory array 570 may be supplied simultaneously to a load device not illustrated.

At this point the current on the write line 631 of register 1 may be terminated, and next currents on the read line 635 of register 2 and the terminals 601 through 603 at the bottom of respective columns 1 through 3 may be terminated. Alternatively, currents on the write line 631 of register 1, the read line 635 of register 2 and the terminals 601 through 603 at the bottom of respective columns 1 through 3 may be terminated simultaneously. Direct current signals applied to the terminals 591 through 593 are maintained. Thus the transfer operation is completed.

The binary word 110 stored in register 2 in the foregoing illustration may have been transferred to register 3 by energizing the write line 633 at the same time that the write line 631 of register 1 was energized. Furthermore, the binary word 110 in register 2 may have been transformed to registers 1 and 3 simultaneously by energizing the write line 633 at the same time the write line 631 was energized. It is evident therefore that information in one register may be transferred within the memory device to any other register, to all other registers or to any combination of the other registers. It is further apparent that information may be transferred from any selected register of the memory device in FIGS. 11 through 13 to an external load device coupled to the vertical lines 611 through 615 merely by energizing the read line of the selected register and simultaneously applying currents to the terminals 601 through 603 at the bottom of respective columns 1 through 3.

Referring next to FIGS. 15 through 17, a memory array 801 is illustrated with three rows and three columns, but it is to be understood that this memory array may be increased or decreased as desired by changing the number of columns or rows. Registers 1 through 3 are disposed along the rows of the memory array. Registers 1 through 3 have respective write lines 802 through 804 and respective read lines 805 through 807. Register 1 includes storage loops 811 through 813; register 2 includes storage loops 814 through 816; and register 3 includes storage loops 817 through 819. Each of these loops is defined by the points *a*, *b*, *c* and *d* associated with the loop number. The write line 802 in register 1 includes control loops 831 through 833 in respective columns 1 through 3, and the read line 805 in register 1 includes sense loops 834 through 836.

The write line 803 in register 2 includes control loops 841 through 843, and the read line 806 in register 2 includes sense loops 844 through 846. The wire line 804 in register 3 includes control loops 851 through 853, and the read line 807 includes sense loops 854 through 856. The foregoing control loops and sense loops are defined by the points *a*, *b*, *c* and *d* associated with the loop number. Direct current signals are applied to terminals 861 through 863 at the top of respective columns 1 through 3, and these currents are maintained throughout the period that the memory array 801 is operated. These currents exit at the bottom of columns 1 through 3 through respective terminals 864 through 866. Input signals representative of information to be written in the memory array 801 are applied to terminals 871 through 876 at the top of columns 1 through 3, and currents applied to these terminals flow on respective vertical lines 881 through 886 to associated exit terminals 887 through 889 at the bottom of columns 1 through 3.

Currents are applied to terminals 901 through 903 at the top of respective columns 1 through 3 during a read operation, and these currents flow on associated vertical lines 911 through 916. Currents on the lines 911 through 916 flow via respective terminals 921 through 926 and through a load device not illustrated. The vertical line 911 in column 1 includes cryotrons 931 through 933, and the vertical line 912 includes cryotrons 934 through 936. The vertical line 913 in column 2 includes cryotrons 941 through 943, and the vertical line 914 includes cryotrons 944 through 946. The vertical line 915 in column 3 includes cryotrons 951 through 953, and the vertical line 916 includes cryotrons 954 through 956.

The control loop 831 in column 1 of register 1 includes cryotrons 961 and 962; the control loop 832 in column 2 of register 1 includes cryotrons 963 and 964; and the control loop 833 in column 3 of register 1 includes cryotrons 965 and 966. The sense loop 834 in column 1 of register 1 includes cryotrons 971 and 972; the sense loop 835 in column 2 of register 1 includes cryotrons 973 and 974; and the sense loop 836 in column 3 of register 1 includes cryotrons 975 and 976. The control loop 841 in column 1 of register 2 includes cryotrons 981 and 982; the control loop 842 in column 2 of register 2 includes the cryotrons 983 and 984; and the control loop 843 in column 3 of register 2 includes cryotrons 985 and 986.

The sense loop 844 in column 1 of register 2 includes cryotrons 991 and 992; the sense loop 845 in column 2 of register 2 includes cryotrons 993 and 994; and the sense loop 846 in column 3 of register 2 includes cryotrons 995 and 996. The control loop 851 in column 1 of register 3 includes the cryotrons 1001 and 1002; the control loop 852 in column 2 of register 3 includes cryotrons 1003 and 1004; and the control loop 853 in column 3 of register 3 includes cryotrons 1005 and 1006. The sense loop 854 in column 1 of register 3 includes cryotrons 1011 and 1012; the sense loop 855 in column 2 of register 3 includes cryotrons 1013 and 1014; and the sense loop 856 in column 3 of register 3 includes cryotrons 1015 and 1016.

The storage loop 811 in column 1 of register 1 includes cryotrons 999 and 1000; the storage loop 812 in column 2 of register 1 includes cryotrons 1007 and 1008; and the storage loop 813 includes cryotrons 1009 and 1010. In register 2 the storage loop 814 includes cryotrons 1017 and 1018; the storage loop 815 includes cryotrons 1019 and 1020; and the storage loop 816 includes cryotrons 1021 and 1022. In register 3 the storage loop 817 includes cryotrons 1023 and 1024; the storage loop 818 includes cryotrons 1025 and 1026; and the storage loop 819 includes cryotrons 1027 and 1028.

The memory device of FIGS. 15 through 17 may be operated to write in a selected register a binary word supplied from an external device and simultaneously read a binary word from a different register and supply it to another external device. It is permissible to read one register and supply the information to an external device and simultaneously receive another word from an external device and write it in any other register, all other registers or any combination of the other registers in the memory device. Information may be transferred from one register to another, to all others or any combination of the others.

In order to illustrate a writing operation in the memory array of FIGS. 15 through 17, let it be assumed that the binary word 011 is to be written in register 3, and the word 011 is to be supplied by an external device, not illustrated, to the vertical lines 881 through 886. D.C. signals are applied to the terminals 861 through 863 at the top of respective columns 1 through 3, and these signals remain on as long as the memory array 801 is in operation. Assuming these signals have been applied, signals representative of information are established on the lines 881 through 886. The binary word 011 is represented by currents on the vertical lines 882, 883 and 885 of respective columns 1 through 3. Next, current is applied to the write line 804 of register 3. Alternatively, information signals may be applied through terminals 871 through 876 to the respective vertical lines 881 through 886 simultaneously as a write current is applied to the write line 802.

Considering first what happens in column 1, the current in the vertical line 882 drives the gate of the cryotron 1002 resistive. This causes the write current on the line 804 to flow through that leg of the control loop 851 defined by the points 851*a* and 851*b*. Current in this leg drives the gate of the cryotron 1023 resistive and diverts current flowing downwardly to the storage loop 817 through the right-hand portion defined by the points 812*b* and 812*c*. Current flowing in the right-hand portion of the storage loop 817 represents a binary zero.

Considering next column 2 of register 3, current on the vertical line 883 drives the gate of the cryotron 1003 resistive. This diverts current through that portion of control loop 852 defined by the points 852*a*, 852*d*, 852*c* and 852*b*. Current in this portion of the control loop 852 drives the gate of the cryotron 1026 resistive and diverts current flowing to the control loop 818 through the left-hand portion defined by the points 818*a* and 818*d*. Current in this portion of the storage loop 818 represents a binary one.

Considering next column 3 of register 3, current on the vertical line 885 drives the gate of the cryotron 1005 resistive and diverts current flowing into the loop 853 around that portion of the loop defined by the points 853*a*, 853*d*, 853*c* and 853*b*. Current in this portion of the loop 853 drives the gate of the cryotron 1028 resistive and diverts current flowing downwardly to the storage loop 819 through that portion of this storage loop defined by the points 819*a* and 819*d*. Current in this portion of the storage loop 819 represents a binary one. At this point current on the write line 804 may be terminated and subsequently currents supplied to the vertical lines 881 through 886 may be terminated. Alternatively, currents on the write line 804 and currents on the vertical line 881 through 886 may be terminated simultaneously. The binary word 011 is represented in register 3 by a current in the left-hand portion of the storage loop 817 and currents in the right-hand portion of the storage loops 818 and 819. Thus the writing operation is completed. It is readily seen that the binary word 011 may have been written in register 1 or register 2 by energizing the respective write lines 802 or 803 at the same time the write line 804 was energized in register 3. Furthermore, the binary word 011 may have been written in all of the registers 1 through 3 by energizing the respective write line 802 through 804 at the same time the write line 804 of register 3 was energized.

In order to illustrate a reading operation from the memory array 801 in FIGS. 15 through 17, let it be assumed the binary word 101 is stored in register 2 and that register 2 is selected to be read to an external device. It is assumed that D.C. signals earlier were applied to terminals 861 through 863 of respective columns 1 through 3. It is further assumed that the binary word 101 is represented in register 2 by a current in the left-hand portion of the storage loop 814, a current in the right-hand portion of the storage loop 815 and a current in the left-hand portion of the storage loop 816. First, signals are applied to the terminals 901 through 903 at the top of respective columns 1 through 3, and the current is applied to the read line 806 of register 2. Alternatively, currents may be applied simultaneously to the terminals 901 through 903 and the read line 806.

Considering first what happens in column 1 of register 2, current in the left-hand portion of the loop 814 defined by the points 814*a* and 814*d* drives the gate of the cryotron 991 resistive. The resistance of the gate of the cryotron 991 diverts current on the read line 806 through that portion of the control loop 844 defined by the points 844*d*, 844*a*, 844*b* and 844*c*. Current in this leg of the control loop 844 drives the gate of the cryotron 935 resistive and causes current from the terminal 901 at the top of column 1 to be diverted to the vertical line 911. Current flows on the line 911 to the exit terminal 921 at the bottom of column 1. Current to the terminal 921 represents a binary one.

Considering next what happens in column 2, current through that portion of the storage loop 815 in register 2 defined by the point 815*b* and 815*c* drives the gate of the cryotron 994 resistive. The resistance of this gate causes the current flowing into the control loop 845 from the left to be diverted through that portion of this loop defined by the points 845*d* and 845*c*. Current in this leg of the control loop 845 drives the gate of the cryotron 942 resistive and diverts current from the terminal 902 at the top of column 2 through the vertical line 914 to the exit terminal 924. Current applied to the exit terminal 924 represents a binary zero.

In column 3, current flowing in the left-hand portion of the storage loop 816 between the points 816*a* and 816*d* drives the gate of the cryotron 995 resistive. The resistance of this gate diverts current flowing into the control loop 846 through that portion of this loop defined by the points 846*d*, 846*a*, 846*b* and 846*c*. Current in this leg of the control loop 846 drives the gate of the cryotron 955 resistive and diverts current from the terminal 903 at the top of column 3 through the vertical line 915 to the exit terminal 925. Current flowing to the exit terminal 925 represents a binary one. It is seen therefore that currents to the terminals 921 through 925 represent the binary word 101. At this point currents applied to the terminals 901 through 903 and to the read line 806 of register 2 may be terminated. The readout operation is complete.

Information may be read from register 1 or register 3 by energizing the terminals 901 through 903 with currents and energizing the read line 805 with the current or the read line 807 with the current. The read operation illustrated above with respect to register 2 may take place simultaneously with the write operation illustrated above with respect to register 3. It is pointed out that a selected register in the memory array 801 in FIGS. 15 through 17 may be read out to an external device simultaneously as any one or any combination of the remaining registers are written into with information received from an external device. Alternatively, it is readily seen that a transfer from one register may be made to another register simultaneously as the same information is sent to an external device.

FIGS. 19 and 20 illustrate another memory array 1030. These figures should be disposed side by side in the manner indicated in FIG. 21. The memory array 1030 is illustrated as having two columns and three rows, but it is to be understood that the number of rows and the number of columns may be increased or decreased as required. Registers 1 through 3 are disposed along the rows of the memory array 1030. Registers 1 through 3 have respective write lines 1031 through 1033 and respective read lines 1034 through 1036. When the write line 1031 in register 1 is energized, it drives the gates of cryotrons 1041 through 1044 resistive, and when the read line 1034 is energized, it drives the gates of cryotrons 1045 through 1048 resistive. When the write line 1032 of register 2 is energized, it drives the gates of the cryotrons 1051 through 1054 resistive, and when the read line 1035 is energized, it drives the gates of cryotrons 1055 through 1058 resistive. When the write line 1033 is energized with a current, it drives the gates of cryotrons 1071 through 1074 resistive, and when the read line 1036 is energized with a current, it drives the gates of the cryotrons 1075 through 1078 resistive.

Register 1 includes storage loops 1091 and 1092; register 2 includes storage loops 1093 and 1094 in respective columns 1 and 2; and register 3 includes storage loops 1095 and 1096 in respective columns 2 and 3. Direct current signals are applied to terminals 1101 and 1102 at the top of respective columns 1 and 2, and these currents flow through the storage loops in columns 1 and 2 and exit at terminals 1103 and 1104 at the bottom of respective columns 1 and 2. Currents are applied to terminals 1111 and 1112 at the top of respective columns 1 and 2, and these signals flow along vertical lines 1113 through 1116 to associated exit terminals 1117 and 1118 at the bottom of respective columns 1 and 2. The vertical line 1113 includes control loops 1131 through 1133, and the vertical line 1114 includes control loops 1134 through 1136. The vertical line 1115 includes control loops 1141 through 1143, and the vertical line 1116 includes control loops 1144 through 1146. Each of these loops is defined by the points *a*, *b*, *c* and *d* associated with the loop number.

Currents are applied to terminals 1151 and 1152 at the top of respective columns 1 and 2 during a read operation, and these currents flow along vertical lines 1153 through 1156 to associated exit terminals 1157 and 1158 at the bottom of respective columns 1 and 3. The vertical line 1153 includes sense loops 1171 through 1173, and the vertical line 1154 includes sense loops 1174 through 1176. The vertical line 1155 includes sense loops 1181 through 1183, and the vertical line 1156 includes sense loops 1184 through 1186. Each of the foregoing loops is defined by the points *a*, *b*, *c* and *d* associated with the loop number.

The storage loop 1091 in column 1 of register 1 includes cryotrons 1191 and 1192, and the storage loop 1092 in column 2 of register 1 includes cryotrons 1193 and 1194. The sense loops 1171 and 1174 in column 1 of register 1 include respective cryotrons 1195 and 1196, and the sense loops 1181 and 1184 in column 2 of register 1 include respective cryotrons 1197 and 1198.

The storage loop 1093 in column 1 of register 2 includes cryotrons 1201 and 1202, and the storage loop 1094 in column 2 of register 1 includes cryotrons 1203 and 1204. The sense loops 1172 and 1175 in column 1 of register 2 include respective cryotrons 1205 and 1206, and sense loops 1182 and 1185 in column 2 of register 2 include respective cryotrons 1207 and 1208.

The storage loop 1095 in column 1 of register 3 includes cryotrons 1221 and 1222, and the storage loop 1096 in column 2 of register 3 includes cryotrons 1223 and 1224. The sense loops 1173 and 1176 in column 1 of register 3 include respective cryotrons 1225 and 1226, and the sense loops 1183 and 1186 in column 2 of register 3 include respective cryotrons 1227 and 1228.

An input device 1240 is operated to supply signals representative of information to the memory array 1030. The input device 1240 includes switches 1241 and 1242 connected to respective resistors 1243 and 1244, which in turn are connected to respective batteries 1245 and 1246. The switches 1241 and 1242 are closed to the right on respective contacts 1251 and 1252 to represent binary ones, and the switches are closed to the left on respective contacts 1253 and 1254 to represent binary zeros. The switches 1241 and 1242 may be closed on respective contacts 1255 and 1256 when the input device 1240 is not employed in a writing operation. The switch 1240 controls the battery current which operates cryotrons 1261 and 1262. The switch 1242 controls the battery current which operates cryotrons 1263 and 1264.

A column sense circuit 1280 is operated during a read operation to supply signals representative of information to a utilization device not illustrated. Currents applied to terminals 1281 and 1282 pass through associated cryotrons 1283 through 1286 to respective output terminals 1301 through 1304.

The memory device 1030 in FIGS. 19 and 20 may be operated to read from one register to an external device and simultaneously write in a different register information received from an external device. Information received from an external device may be written in a selected register, all registers or any combination of registers. It is possible to mask one or more positions of a word, including all positions of a word, supplied by the input device to the memory array 1030.

In order to illustrate a writing operation, let it be assumed that the binary word 10 is to be written in register 1. First D.C. signals are supplied to terminals 1101 and 1102 at the top of respective columns 1 and 2. These signals remain on as long as the memory array 1030 is operated. Next, the switches 1241 and 1242 are closed on respective contacts 1251 and 1254. Currents from the battery 1243 drives the gate of the cryotron 1262 resistive, and current from the battery 1426 drives the gate of the cryotron 1263 resistive. At this point currents may be applied to the terminals 1111 and 1112 at the top of respective columns 1 and 2. Current from the terminal 1111 is diverted by the resistance of the gate of the cryotron 1262 to the vertical line 1113, and current flows along this line to the exit terminal 1117. Current from the terminal 1112 at the top of column 2 is diverted by the the resistance of the gate of the cryotron 1263 to the vertical line 1116, and current flows along this line to the exit terminal 1118. Current on the vertical line 1113 represents a binary one and current on the vertical line 1116 represents a binary zero.

Next, a current is applied to the write line 1031 and this drives the gates of the cryotron 1041 through 1044 resistive. Current in the vertical line 1113 is diverted by the resistance of the gate of the cryotron 1041 through that portion of the control loop 1131 defined by the points 1131*a*, 1131*b*, 1131*c* and 1131*d*. Current flowing in this leg of the control loop 1131 drives the gate of the cryotron 1191 resistive and diverts current from the terminal 1101 through that portion of the storage loop 1091 defined by the points 1091*b* and 1091*c*. Current in this right-hand portion of the storage loop 1091 represents a binary one. Current flowing in the vertical line 1116 of column 2 is diverted by the resistive gate of the cryotron 1044 through that portion of the control loop 1144 defined by the points 1144*b*, 1144*a*, 1144*d* and 1144*c*. Current through this leg of the control loop 1144 drives the gate of the cryotron 1194 resistive and diverts current from the terminal 1102 through the left-hand portion of the storage loop 1092 defined by the points 1092*a* and 1092*d*. Current in the left-hand portion of the storage loop 1092 represents a binary zero. Thus the binary word 10 is written in columns 1 and 2 of register 2. Current on the write line 1031 and currents to the terminals 1111 and 1112 at the top of respective columns 1 and 2 may be terminated. The switches 1241 and 1242 may be returned to respective center contacts 1255 and 1256 although this is optional. The writing operation is therefore completed.

The binary word 10 used in the above illustration may have been written in register 2 or register 3 by energizing respective write lines 1032 or 1033 at the same time that the write line 1031 was energized. The binary word 10 may have been written in any one of the registers 1 through 3, in all of the registers 1 through 3 or in any combination of the registers 1 through 3 by energizing a selected one or combination of the write lines of respective registers 1 through 3.

In order to illustrate a read operation, let it be assumed that the binary word 10 is stored in register 1 and that register 1 is selected for a readout operation. It is assumed that the D.C. signals have been maintained on the terminals 1101 and 1102 at the top of respective columns 1 and 2. Next, currents are applied to terminals 1151 and 1152 at the top of respective columns 1 and 2, and a current is applied to the read line 1034 of register 2. The current on the read line 1034 drives the gates of the cryotrons 1045 through 1048 resistive.

Considering what happens in column 1, current in the right-hand portion of the storage loop 1091 flowing between the points 1091*b* and 1091*c* drives the gate of the cryotron 1196 resistive, and current on the read line 1034 drives the gate of the cryotron 1046 resistive. As a result, current from the terminal 1151 at the top of column 1 is diverted to the vertical line 1153. The current on the line 1153 flows to the exit terminal 1157 at the bottom of column 1. Current in the vertical line 1153 drives resistive the gate of the cryotron 1283 in the column sense circuit 1280. Accordingly, current from the terminal 1281 is diverted to the exit terminal 1302, and current to this terminal represents a binary one.

Considering next what happens in column 2, current flowing in the left-hand portion of the storage loop 1092 defined by the points 1092*a* and 1092*d* drives the gate of the cryotron 1197 resistive. The gate of the cryotron 1047 is driven resistive by current on the read line 1034. As a result current from the terminal 1152 at the top of column 2 is diverted along the vertical line 1156 to the exit terminal 1158 at the bottom of column 2. Current on the vertical line 1156 drives resistive the gate of the cryotron 1286 in the column sense circuit 1280. As a result current from the terminal 1282 is diverted to the exit terminal 1303. Current to the terminal 1303 represents a binary zero. The terminals 1101 through 1104 may be connected to a utilization device not shown.

It is seen that the binary word 10 is represented by currents applied to the terminals 1302 and 1303. The binary word 10 stored in register 1 is read out through the column sense circuit to a load device not illustrated. At this point currents applied to the terminals 1111 and 1112 and the current applied to the read line 1034 of register 1 may be terminated. Information stored in registers 2 or 3 may be read out by energizing the terminals 1111 and 1112 at the top of respective columns 1 and 2 while simultaneously energizing either the write line 1032 or the write line 1033. It is pointed out that a read operation may take place from one register and simulateously a write operation may be performed in any one of the remaining registers, in all of the remaining registers or in any combination of all of the remaining registers.

It is sometimes desirable to mask or leave undisturbed information in certain portions of a register in memory. For example, it may be desirable to write new information in certain positions of a register in memory but retain existing information in certain other positions of a register in memory. For this purpose switches 1310 and 1311 are provided in the input device 1240. The switch 1310 is connected to the exit terminal 1117, and a switch 1311 is connected to the exit terminal 1118. If either of these switches is opened during a writing operation, information in the associated column of the selected register is not disturbed because the open circuit condition prevents currents from flowing on the vertical lines 1113 through 1116. Consequently, new information cannot be written in column 1 if the switch 1310 is open, and new information cannot be written in column 2 if the switch 1311 is open. The switch 1310 may be considered a ternary control for the vertical lines 1113 and 1114. The switch 1113 may be considered a ternary control for the vertical lines 1115 and 1116. The switches 1310 and 1311 remain closed during normal writing operations.

What is claimed is:

1. A memory system having a plurality of plural stage registers for the storage of information, means coupled to the memory system for transferring information in parallel from a first register to a first external device, means coupled to the memory system for transferring information in parallel from a second register to a second external device, and means coupled to the memory system for transferring information in parallel from a third external device into a third register, said first, second and third transfers occurring simultaneously.

2. A cryogenic system comprising a plurality of plural stage registers forming the rows in a storage matrix, each stage of said registers comprising a superconductive loop containing a cryotron for controlling a persistent current in said loop, corresponding stages in said registers forming the columns in said storage matrix, means for transferring data in parallel internally from one register to any other register without requiring a data transfer to a device external to the memory, means for writing information in parallel simultaneously into a plurality of said registers, means for reading information in parallel from said registers while said writing operation is in progress, and means for masking any desired stage to allow the data in that stage to remain undisturbed.

References Cited by the Examiner

UNITED STATES PATENTS

| | | | |
|---|---|---|---|
| 2,763,432 | 9/56 | York | 235—92 |
| 2,799,449 | 7/57 | Turing et al. | 340—172.5 |
| 2,902,217 | 9/59 | Davis | 340—172.5 |
| 2,978,685 | 4/61 | Eckdahl | 235—167 |
| 3,019,353 | 1/62 | MacKay | 340—173.1 |
| 3,021,440 | 2/62 | Anderson | 340—173.1 |
| 3,114,137 | 12/63 | Morgan | 340—174 |

IRVING L. SRAGOW, *Primary Examiner.*

EVERETT R. REYNOLDS, *Examiner.*